United States Patent [19]

Higashihara et al.

[11] Patent Number: 5,089,843

[45] Date of Patent: Feb. 18, 1992

[54] AUTO FOCUS DEVICE WITH PREDICTIVE FOCUSSING

[75] Inventors: Masaki Higashihara, Yokohama; Ichiro Ohnuki, Kawasaki; Akira Akashi; Terutake Kadohara, both of Yokohama, all of Japan

[73] Assignee: Canon Kabushiki Kaisha, Tokyo, Japan

[21] Appl. No.: 671,649

[22] Filed: Mar. 20, 1991

Related U.S. Application Data

[63] Continuation of Ser. No. 460,048, Jan. 2, 1990, abandoned.

[30] Foreign Application Priority Data

Jan. 9, 1989 [JP] Japan ................................. 1-2222
Jan. 9, 1989 [JP] Japan ................................. 1-2223

[51] Int. Cl.$^5$ ............................................. G03B 13/36
[52] U.S. Cl. .................................................. 354/402
[58] Field of Search ............... 354/400, 402, 403, 404, 354/405, 406, 407, 408, 409, 195.1, 195.11, 430

[56] References Cited

U.S. PATENT DOCUMENTS 4,783,677  11/1988  Hamada .............................. 354/402

Primary Examiner—W. B. Perkey
Assistant Examiner—Casandra C. Spyrou
Attorney, Agent, or Firm—Fitzpatrick, Cella, Harper & Scinto

[57] ABSTRACT

An auto focus device for predicting the position of a moving objerct after a predetermined time on the basis of past autofocus operations and driving the lens to focus on the predicted position. The predetermined time being calculated based on the discrimination of the direction of movement of the object. The predicting calculations place the lens in a closer near state rather than making the lens in focus to the moving object.

15 Claims, 18 Drawing Sheets

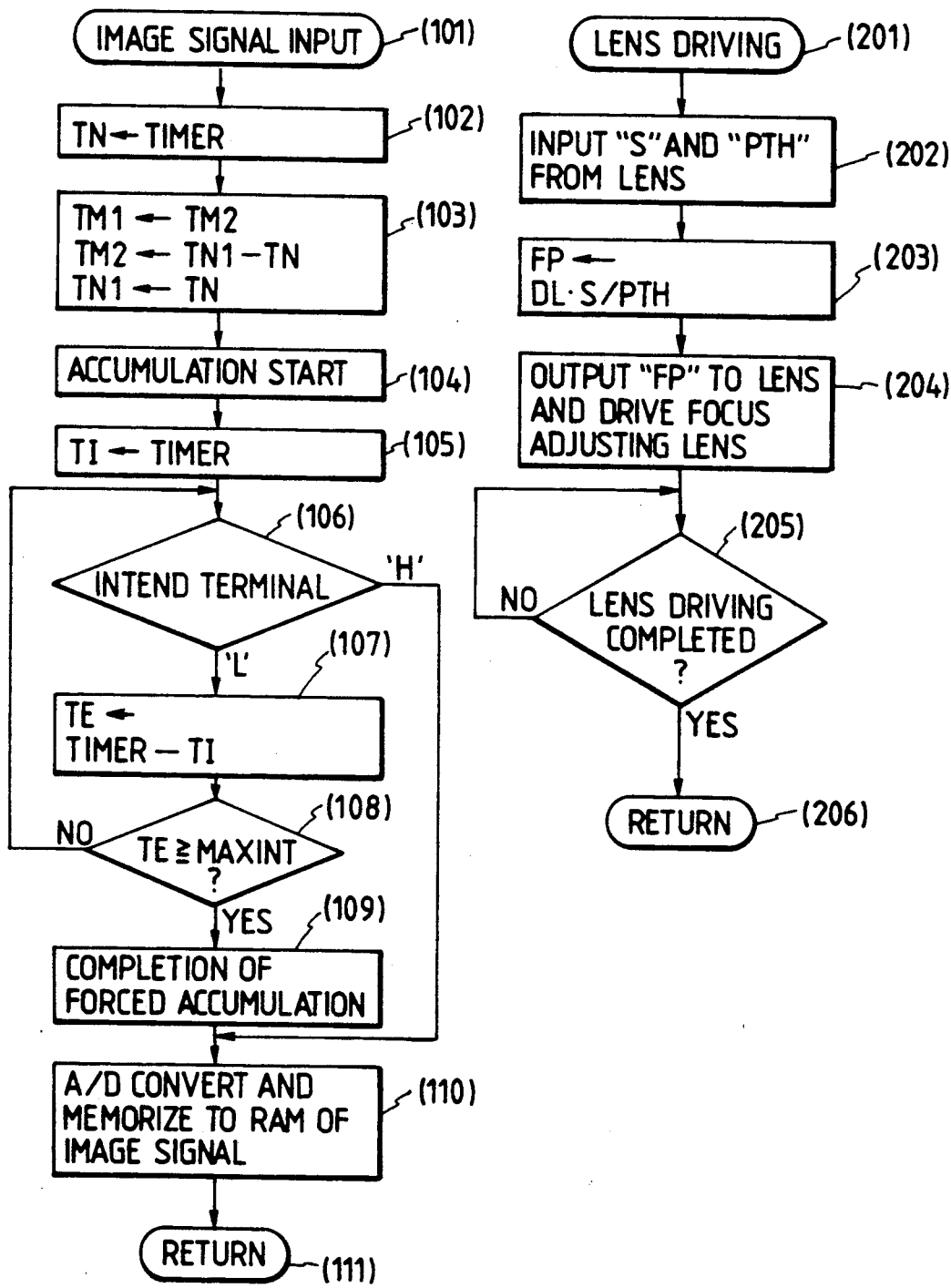

AUTO FOCUS DEVICE WITH PREDICTIVE FOCUSSING

This application is a continuation of application Ser. No. 07/460,048 filed Jan. 2, 1990, now abandoned.

BACKGROUND OF THE INVENTION

1. Field of the Invention

This invention relates to an automatic focus adjusting device for use in a camera or the like.

2. Related Background Art

Many automatic focus adjusting systems in single-lens reflex cameras are such that the cycle of "focus detection (sensor signal input and calculation of focus detection) and lens driving" is repetitively effected to thereby focus a photo-taking lens on an object. The amount of lens driving in each cycle is based on the defocus amount at a point of time whereat focus detection is effected in that cycle, and this presumes that the defocus amount during focus detection is eliminated when lens driving is completed.

As a matter of course, focus detection and lens driving require their respective times, but in the case of a stationary object, the defocus amount does not vary unless the lens is driven and therefore, the defocus amount which should be eliminated at a point of time whereat lens driving is completed is equal to the defocus amount at a point of time whereat the focus is detected, and thus, proper focus adjustment is accomplished.

However, in the case of an object which is in great motion, the defocus amount may vary during focus detection and lens driving and the defocus amount which should be eliminated may differ remarkably from the detected defocus amount, which in turn may result in the problem that the lens is not in focus to the object when lens driving is completed.

As an automatic focus adjusting method directed to the solution of the above-noted problem, the assignee has proposed Japanese Patent Application No. 62-263728.

The gist of the method disclosed in this patent application is that in view of the detected defocus amount and the amount of lens driving in each said cycle and the time interval of each cycle, the relation between the imaging plane position attributable to movement of an object and time is approximated to a linear function over a quadratic function to thereby correct the amount of lens driving, and the above-noted problem can be expected to be overcome by this method.

In the case of such a foreseeing method, however, a difference between the foreseen lens position and the actual imaging plane position (a foreseeing error) results from a lens driving error and a focus detection error. This foreseeing error is usually a magnitude more times to ten and several times as great as said focus detection error and said lens driving error. Therefore, in the conventional automatic focus adjusting device, even when an object enters the depth of the imaging plane and it can be judged that the lens is in focus, if the aforedescribed foreseeing method is used, there is the possibility that the focus (imaging) position comes out of the depth of the imaging plane with a result that the photograph taken is out of focus. As an automatic focus adjusting method directed to the solution of such a problem, the assignee has proposed Japanese Patent Application No. 63-25490.

The gist of the method disclosed in this patent application is that of foreseeing functions of several orders used in the foreseeing operation, a term of high order which is ready to be affected by a focus detection error and a lens driving error and in which a great the foreseeing error occurring is corrected to thereby decrease the influence of errors occurring in a lens driving system and a focus detecting system and improve the accuracy of foreseeing.

A description will hereinafter be given of the focus deviation engendered by the above-described correction.

FIG. 2 of the accompanying drawings is a graph for illustrating the above-described lens driving correcting method. In the graph, the abscissa represents time t and the ordinate represents the imaging plane position x of an object.

Curve x(t) indicated by a solid line means the imaging plane position, at a time t, of an object coming close to the camera in the direction of the optic axis when the photo-taking lens of the camera is at infinity. Curve l(t) indicated by a broken line means the position of the photo-taking lens at the time t, and the in-focus state is provided when the curves x(t) and the l(t) coincide with each other. $[t_i, t_i']$ indicates the focus detecting operation time, and $[t_i', t_{i+1}]$ indicates the lens driving operation time. In the example shown in FIG. 2, it is assumed that the imaging plane position changes in accordance with a quadratic function $(at^2+bt+c)$. That is, if the current and the past three imaging plane positions $(t_1, x_1)$, $(t_2, x_2)$ and $(t_3, x_3)$ are known at a time $t_3$, the imaging plane position $x_4$ at a time $t_4$ after TL (AF time lag + release time lag) from the time $t_3$ can be foreseen (AF time lag: the time required for focus detection and lens driving; release time lag: the time from after a release command is put out until exposure is started).

However, what can be actually detected by the camera is not the imaging plane positions $x_1$, $x_2$ and $x_3$, but defocus amounts $DF_1$, $DF_2$, $DF_3$ and amounts of lens driving $DL_1$ and $DL_2$ as converted into amounts of movement of the imaging plane. The time $t_4$ is a future value to the last and actually is a value varying in accordance with a variation in the accumulation time of an accumulation type sensor caused by the luminance of an object or a variation in the lens driving time caused by a variation in the amount of lens driving, but here, for simplicity, it is assumed as follows:

$$t_4 - t_3 = TL = TM_2 + (\text{release time lag}) \quad (1)$$

Under the above assumption, the amount of lens driving $DL_3$ calculated from the result of the focus detection at the time $t_3$ can be found as follows:

$$x(t) = at^2 + bt + c \quad (2)$$

Considering $(t_1, l_1)$ in the figure to be the origin, $$t_1 = 0 \qquad x_1 = DF_1 \quad (3)$$
$$t_2 = TM_1 \qquad x_2 = DF_2 + DL_1 \quad (4)$$
$$t_3 = TM_1 + TM_2 \qquad x_3 = DF_3 + DL_1 + DL_2 \quad (5)$$

By substituting the equations (3), (4) and (5) for the equation (2), a, b and c are found as follows:

$$a = \frac{DF_3 + DL_2 - DF_2}{(TM_1 + TM_2) \cdot TM_2} + \frac{DF_1 - DL_1 - DF_2}{(TM_1 + TM_2) \cdot TM_1} \quad (6)$$

-continued $$b = \frac{DF_2 + DL_1 - DF_1 - a \cdot TM_1^2}{TM_1} \quad (7)$$

$$c = DF_1 \quad (8)$$

Consequently, the amount of lens driving $DL_3$ as converted into an amount of movement of the imaging plane at the time $t_4$ is found as follows:

$$\begin{aligned} DL_3 &= x_4 - l_3 \\ &= x_4 - x_3 + DF_3 \\ &= a\{(TM_1 + TM_2 + TL)^2 - (TM_1 + TM_2)^2\} + \\ & \quad b \cdot TL + DF_3 \end{aligned} \quad (9)$$

A method of correcting the second-order term for reducing a foreseeing error engendered by a focus detection error and a lens driving error will now be described with reference to FIG. 3 of the accompanying drawings.

FIG. 3 shows the relation between the imaging plane position and time.

In this figure, the solid line is assumed as the imaging plane position actually moved by the movement of an object, and when errors $\delta_1$ and $\delta_2$ occur between the imaging plane position and the lens position at $t_1$ and $t_2$, respectively, the foreseeing function is as indicated by a dot-and-dash line, and the foreseeing error $\delta_e$ is about eleven times as great as $\delta_1$ and $\delta_2$.

So, the second-order term is corrected by a correction coefficient TF as follows when the amount of lens driving $DL_3$ of the equation (9) as converted into the amount of movement of the imaging plane is calculated:

$$DL_3 = TF \cdot a\{(TM_1 + TM_2 + TL)^2 - (TM_1 + TM_2)^2\} + b \cdot TL + DF_3 \quad (10)$$

In the case of FIG. 3, assuming that the correction coefficient TF=0.6, the foreseeing function is as indicated by a broken line, and the foreseeing error $\delta_e'$ decreases to about ⅓ of the uncorrected foreseeing error $\delta_e$.

The countermeasure using such a correction has the effect of approximating a non-linear function to a linear function and therefore, is greatly effective particularly when the focus detecting operation time interval is small and the movement of the imaging plane can be approximated to a linear function.

However, when the movement of the imaging plane cannot be approximated to a linear function, a focus deviation by the correction occurs.

The occurrence of the focus deviation by the correction will now be described with reference to FIGS. 4 and 5 of the accompanying drawings.

In FIG. 4, the ordinate represents the imaging plane position and the abscissa represents time, and this figure shows a general change in the imaging plane position when an object comes close to the camera. The solid line in this figure indicates the position of the imaging plane which actually moves, and this may be approximated to a quadratic function as follows:

$$x(t) = at^2 + bt + c \quad (11)$$

$(a>0, b>0)$

In contrast, the function corrected by the correction coefficient TF is as follows:

$$x(t) = TF \cdot a \cdot t^2 + b \cdot t + c \quad (12)$$

$(a>0, b>0, 0<TF<1)$

Here, $t_1$ and $t_2$ are the times when distance measurement (focus detection) was effected in the past, $t_3$ is the current time, and $t_4$ is the time which is the target of foreseeing. Consequently, the target at which lens driving is to be effected next is $x_4$.

However, when the correction as represented by the equation (12) is effected, the foreseen imaging plane position at the time $t_4$ is $x_4'$, and a foreseeing error (focus deviation) of $\delta_e$ occurs to in the actual value $x_4$. This is greater as the non-linear component of the foreseeing function is greater, and becomes greater as the correction coefficient is smaller.

Here, in the case of an object which comes close, the coefficients a and b in the equations (11) and (12) are generally $a>0$ and $b>0$, and when objects come close at a predetermined speed, the non-linear component (here the second-order component) is greater for a near object than for a far object and the speed of movement of the imaging plane is also greater. That is, for a far object, the foreseeing error $\delta_e$ caused by the correction of the foreseeing function is sufficiently small, while for a near object, this error may pose a problem in some cases. The then focus deviation always brings about a follow-up delay, i.e., the rearward focus state, if under a general condition ($a>0$).

In FIG. 5, the ordinate represents the imaging plane position and the abscissa represents time, and this figure shows the general movement of the imaging plane when the object goes away from the camera. In this figure, the solid line indicates the position of the imaging plane which actually moves, and this may be approximated to a quadratic function as follows:

$$x(t) = at^2 + bt + c \quad (13)$$

$(a>0, b<0)$

In contrast, the foreseeing function corrected by the correction coefficient TF is as follows:

$$x(t) = TF \cdot at^2 + bt + c \quad (14)$$

$(a>0, b<0, 0<TF<1)$

Here, $t_1$ and $t_2$ are the times when distance measurement was effected in the past, $t_3$ is the current time, and $t_4$ is the time which is the target of foreseeing. Consequently, the target at which the next lens driving is to be effected is $x_4$.

However, when the correction as represented by the equation (14) is effected, the imaging plane position at the time $t_4$ is foreseen as $x_4'$ and there occurs a foreseeing error of $\delta_e$.

Here, in the case of an object which goes away from the camera, the coefficients a and b in the equations (13) and (14) are generally $a>0$ and $b<0$, and in the case of objects which go away from the camera at a predetermined speed, the non-linear component (here the second-order component) is greater for a near object than for a far object, and the speed of movement of the imaging plane is also greater. That is, for a far object, the foreseeing error caused by the correction of the non-linear component of the foreseeing function is sufficiently small, while for a near object for which the non-linear component is great, this error may pose a problem in some cases. This foreseeing error always brings about the preceding of the lens, i.e., the rearward focus state (rear or far focus state), if under a general condition (a>0).

Thus, when the high-order term of the foreseeing function is corrected, there has been the problem that the follow-up performance for a non-linear change in the imaging plane position is reduced and the rearward focus state is always brought about.

SUMMARY OF THE INVENTION

One aspect of the application is to provide an auto focus device by which during the foreseeing operation, a photo-taking lens is shifted toward the forward focus (front or near focus) side by a predetermined amount exceeding the calculated value to thereby move the lens position to a proper position or a camera having such auto focus device.

Another aspect of the application is to provide, under the above object, said auto focus device by which data for a predetermined amount of shift is input as the data for a foreseeing operation to said focusing operation equation to thereby calculate the lens position for effecting the shift to the forward focus side by said predetermined amount.

A further aspect of the application is to provide, under the above object, said auto focus device in which the defocus amount or the time data (as said data for the foreseeing operation) is corrected.

BRIEF DESCRIPTION OF THE DRAWINGS

FIG. 8 shows the "image signal input" subroutine in FIG. 7.

FIG. 9 shows the "lens driving" subroutine in FIG. 7.

DESCRIPTION OF THE PREFERRED EMBODIMENTS

Figure 6:
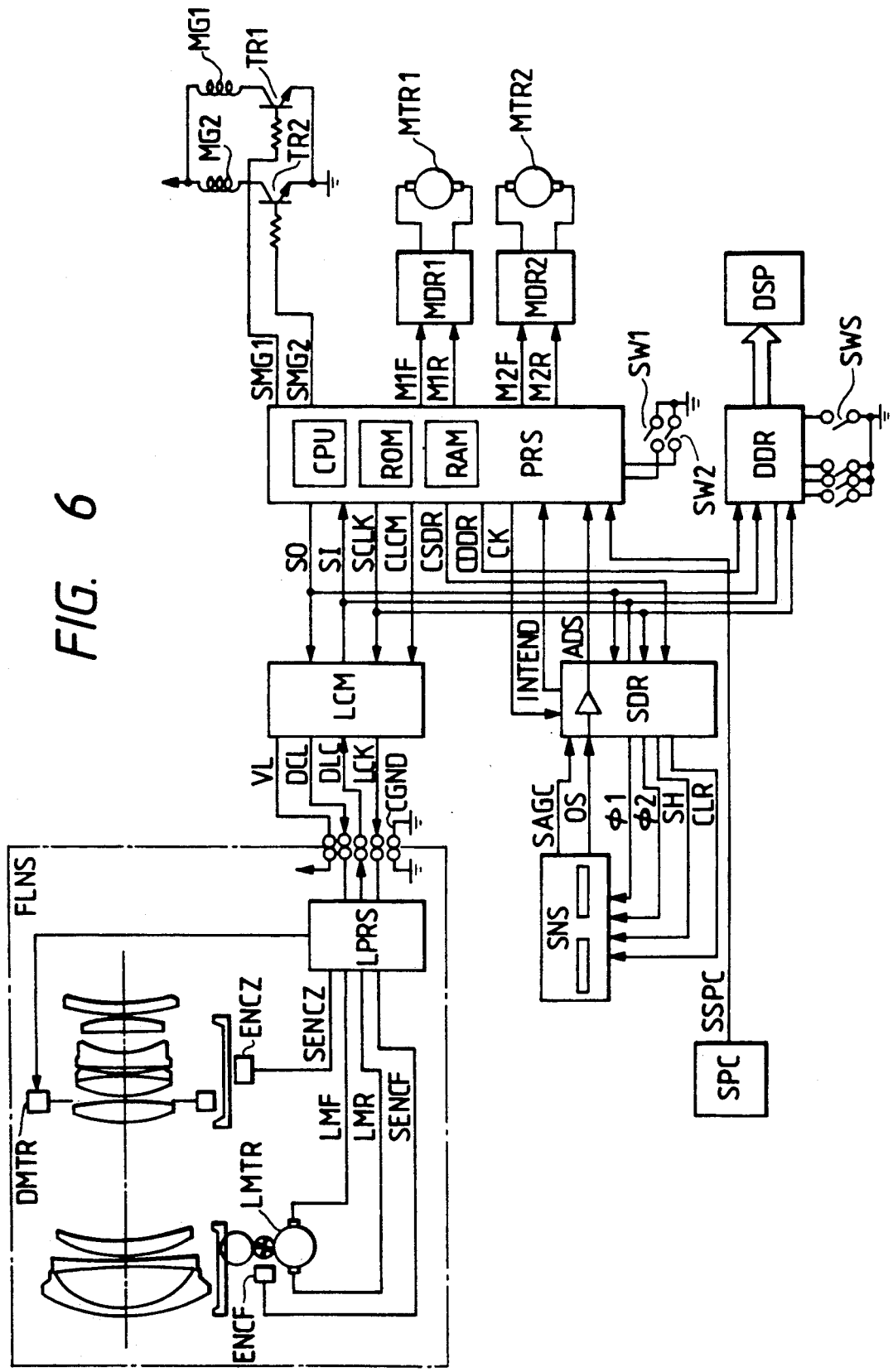
FIG. 6 is a circuit diagram showing an embodiment of the focus adjusting device of the present invention.

FIG. 6 is a circuit diagram showing an embodiment of a camera provided with an auto focus device according to the present invention.

In FIG. 6, PRS designates the control apparatus of the camera which is, for example, a 1-chip microcomputer having a CPU (central processing unit), a ROM, a RAM and an A/D converting function therein. The computer PRS performs a series of operations of the camera such as the automatic exposure controlling function, the automatic focus detecting function and the winding-up of film in accordance with the sequence program of the camera stored in the ROM. For this purpose, the computer PRS uses signals SO, SI and SCLK for synchronous communications and communications selection signals CLCM, CSDR and CDDR to communicate with the surrounding circuits and lens in the camera body and control the operations of each circuit and the lens.

SO is a data signal output from the computer PRS, SI is a data signal input to the computer PRS, and SCLK is a synchronizing clock signal for the signals SO and SI.

LCM denotes a lens communication buffer circuit which supplies electric power to a power source terminal for the lens when the camera is operating and which provides a communication buffer between the camera and the lens when the selection signal CLCM from the computer PRS is at a high potential level (hereinafter referred to as 'H').

When the computer PRS renders CLCM into 'H' and delivers predetermined data SO in synchronism with SCLK, LCM outputs buffer signals LCK and DCL for SCLK and SO to the lens through a contact between the camera and the lens. Simultaneously therewith, LCM outputs a buffer signal for the signal DLC from the lens to PRS, and the computer PRS inputs the data from the lens SI in synchronism with SLCK.

SDR designates a driving circuit for a focus detecting line sensor device SNS comprised of a CCD or the like. The driving circuit SDR is selected when the signal CSDR is at 'H', and is controlled by the computer PRS by the use of SO, SI and SCLK.

A signal CK is a clock for producing CCD driving clocks $\phi_1$ and $\phi_2$, and a signal INTEND is a signal which informs the computer PRS that the accumulating operation has been terminated.

The output signal OS of SNS is a time-serial image signal synchronized with the clocks $\phi_1$ and $\phi_2$, and is amplified by an amplifying circuit in SDR, and thereafter is output as AOS to the computer PRS. The computer PRS receives as an input the signal AOS from an analog input terminal, and A/D-converts it by the A/D converting function therein in synchronism with CK, and thereafter stores it in a predetermined address of the RAM.

SAGC which is also is the output signal from SNS is the output of an AGC (auto gain control) in SNS, and is input to SDR for use for the accumulation control of SNS.

SPC denotes a photometric sensor for exposure control which receives the light from an object passed through a photo-taking lens. The output SSPC of the photometric sensor SPC is input to the analog input terminal of the computer PRS and is A/D-converted, and thereafter is used for automatic exposure control (AE) in accordance with a predetermined program.

DDR designates a switch detection and display circuit which is selected when the signal CDDR is at 'H', and is controlled by the computer PRS by the use of SO, SI and SCLK. That is, the circuit DDR changes over the display of the display member DSP of the camera on the basis of data sent thereto from the computer PRS, and informs the computer PRS of the ON or OFF state of a switch SWS operatively associated with the various operating members of the camera, by communication.

Switches SW1 and SW2 are switches operatively associated with a shutter release button, not shown, and the switch SW1 is adapted to be closed by the first-stage depression of the release button, and the switch SW2 is adapted to be closed by the second-stage depression of the release button. The computer PRS, as will be described later, performs the photometering and automatic focus adjusting operations upon closing of the switch SW1, and effects exposure control and winding-up of film with the closing of the switch SW2 as a trigger. The switch SW2 is connected to the "interrupt input terminal" of the microcomputer PRS, and even when the program is being executed during the closing of the switch SW1, an interruption is caused by the closing of the switch SW2 and a shift can be immediately made to a predetermined interrupt program.

MTR1 designates a motor for feeding the film, and MTR2 denotes a motor for driving the mirror up and down and for charging the shutter spring. The control of the forward rotation and reverse rotation of these motors is accomplished by their respective driving circuits MDR1 and MDR2. Signals M1F, M1R, M2F and M2R input from PRS to MDR1 and MDR2 are motor controlling signals.

MG1 and MG2 denote magnets for starting the movement of forward and rearward shutter curtains. The magnets MG1 and MG2 are electrically energized by signals SMG1, SMG2 and amplifying transistors TR1, TR2, and shutter control is effected by PRS.

The switch detection and display circuit DDR, the motor driving circuits MDR1 and MDR2 and shutter control are not directly concerned in the present invention and therefore need not be described in detail.

A signal DCL input to an in-the-lens control circuit LPRS in synchronism with LCK is command data from the camera to the lens FLNS, and the operation of the lens in response to the command is predetermined.

LPRS analyzes that command in accordance with a predetermined procedure, and effects the focus adjusting and aperture controlling operations and the outputting of various parameters (such as fully open F-number, focal length and the coefficient of defocus amount vs. amount of axial movement) of the lens from the output DLC.

In the embodiment, an example of a zoom lens is shown, and when a command for focus adjustment is sent from the camera, a focus adjusting motor LMTR is driven by signals LMF and LMR in accordance with the amount and direction of driving sent at the same time to thereby move an optical system in the direction of the optic axis and effect focus adjustment. The amount of movement of the optical system is monitored by the pulse signal SENCF of an encoder circuit ENCF and is counted by a counter in LPRS, and at a point of time whereat a predetermined movement has been completed, LPRS itself renders signals LMF and LMR into 'L' and brakes the motor LMTR.

Therefore, after the command for focus adjustment has once been sent from the camera, the control device PRS in the camera need not be concerned at all in lens driving until the driving of the lens is terminated.

Also, when a command for aperture control is sent from the camera, a stepping motor DMTR conventional in aperture driving is driven in accordance with the number of aperture steps sent thereto at the same time.

ENCZ designates an encoder circuit annexed to a zoom optical system, and LPRS receives a signal SENCZ from ENCZ and detects lens zoom positions. A lens parameter in each zoom position is stored in LPRS, and when there is a requirement from PRS of the camera, a parameter corresponding to the current zoom position is sent to the camera.

The operation of the camera constructed as described above will now be described with reference to the flow charts of FIG. 7 and subsequent figures.

When a power source switch, not shown, is closed, the supply of electric power to the microcomputer PRS is started, and the microcomputer PRS starts to execute a sequence program stored in the ROM.

Figure 7:
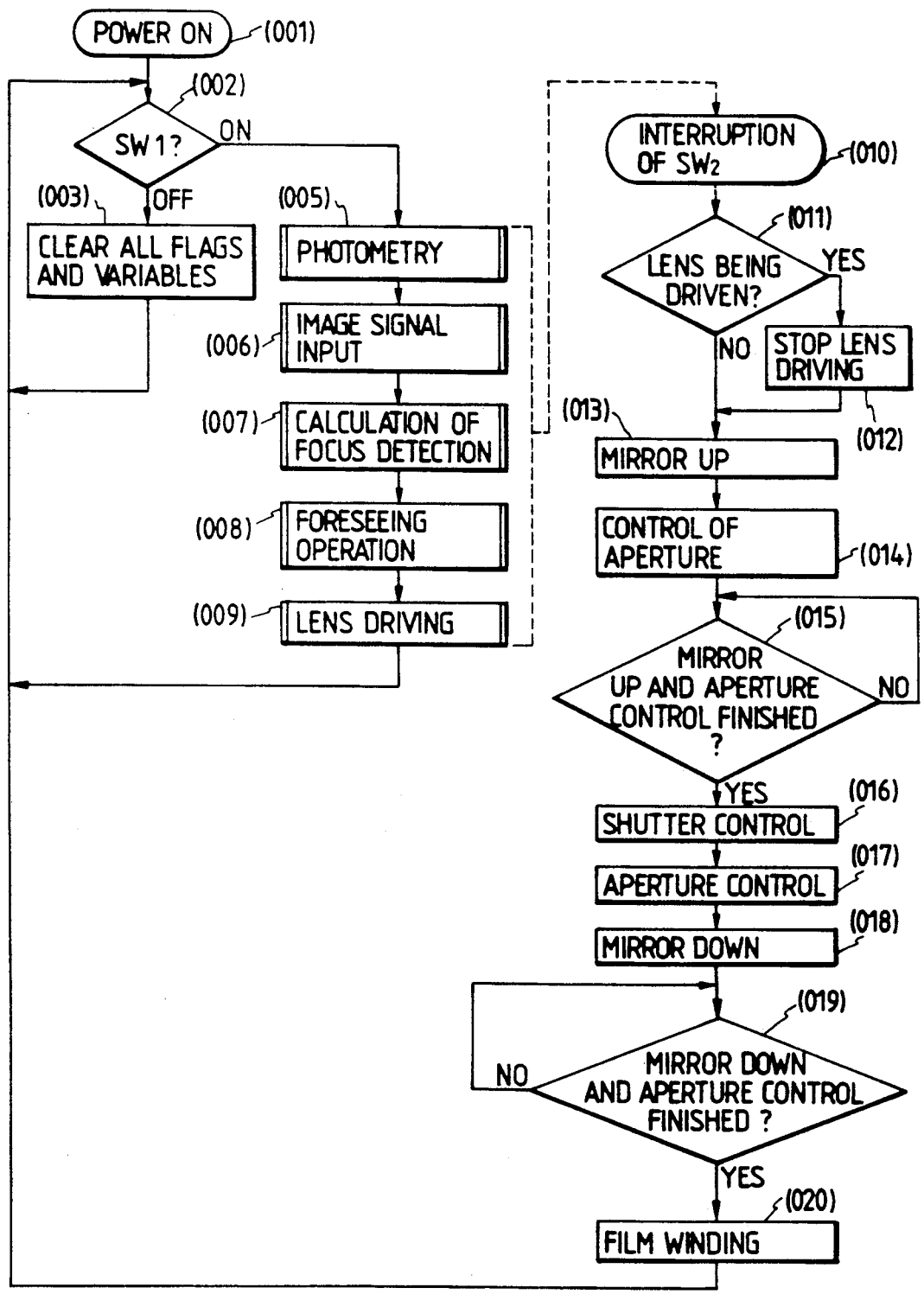
FIG. 7 shows a program flow for illustrating the operation of the automatic focus adjusting device shown in FIG. 6.

FIG. 7 is a flow chart showing the general flow of said program. When the execution of the program is started by the above-described operation, at step (002) via step (001), the state of the switch SW1 adapted to be closed by the first-stage depression of the release button is detected, and if the switch SW1 is OFF, a shift is made to step (003), where all flags and variables for control set in the RAM within the computer PRS are cleared and initialized.

The steps (002) and (003) are repetitively executed until the switch SW1 becomes ON or the power source switch becomes OFF. By the switch SW1 becoming closed, a shift is made from the step (002) to step (005).

At the step (005), the "photometry" subroutine for exposure control is executed. The computer PRS inputs the output of the photometering sensor SPC shown in FIG. 6 to the analog input terminal and A/D-converts it, and calculates an optimum shutter control value and an optimum aperture control value from the digital photometric value, and stores them in predetermined addresses of the RAM. Then, during the release operation, the control of the shutter and aperture is effected on the basis of these values.

Subsequently, at step (006), the "image signal input" subroutine is executed. The flow of this subroutine is shown in FIG. 8, and the computer PRS effects the inputting of an image signal from the focus detecting sensor device SNS. The details of this will be described later.

At the next step (007), the defocus amount DEF of the photo-taking lens is calculated on the basis of the input image signal. A specific calculating method is disclosed in Japanese Patent Application No. 61-160824 by the applicant and therefore need not be described herein in detail.

Figure 1:
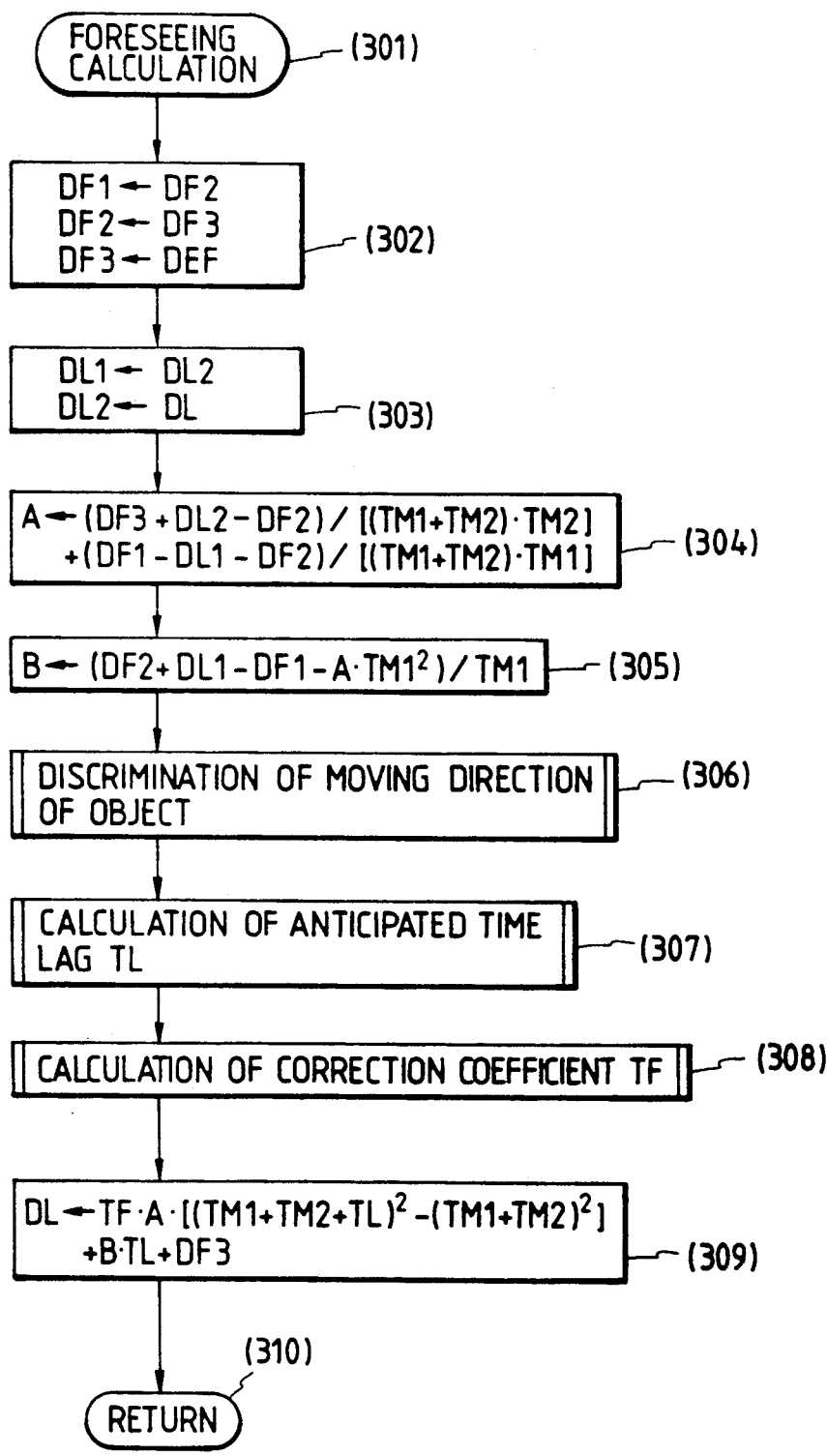
FIG. 1 shows a program for illustrating the foreseeing operation used in the focus adjusting device of the present invention.
Figure 2:
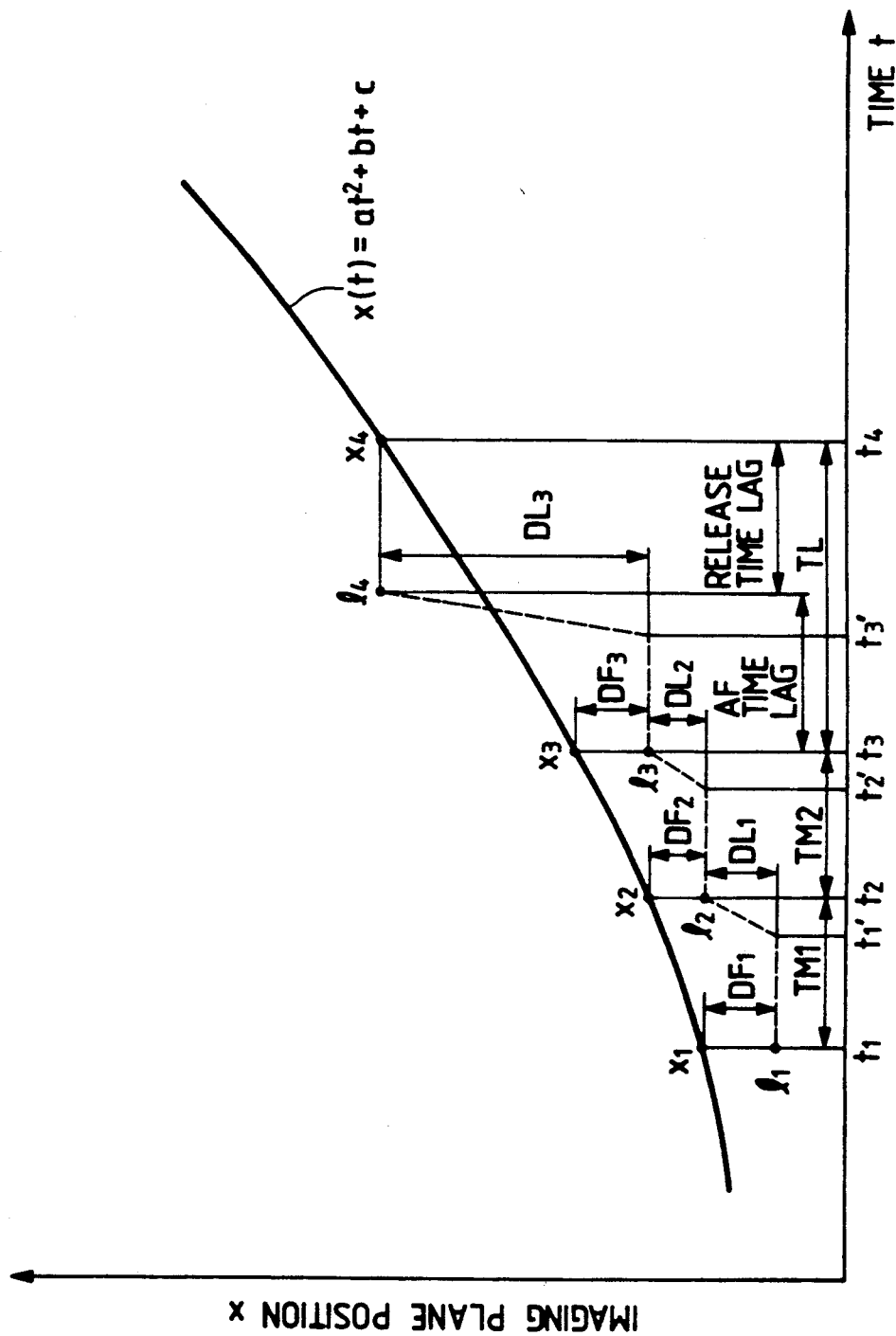
FIG. 2 is a graph for illustrating the principle of the foreseeing operation in the focus adjusting device of the present invention.
Figure 3:
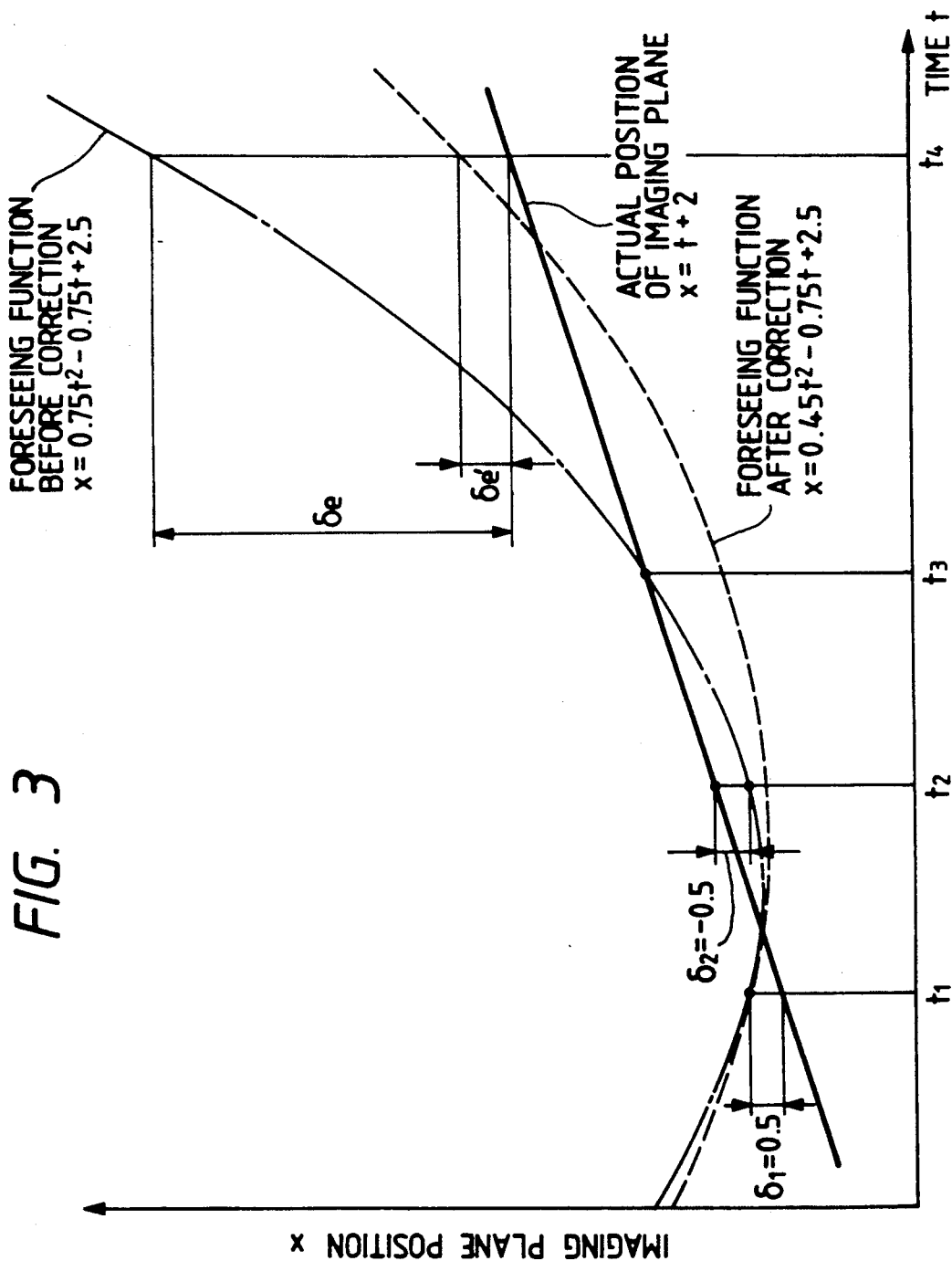
FIG. 3 is a graph for illustrating a foreseeing error engendered by a focus detection error and a lens driving error during the foreseeing operation.
Figure 4:
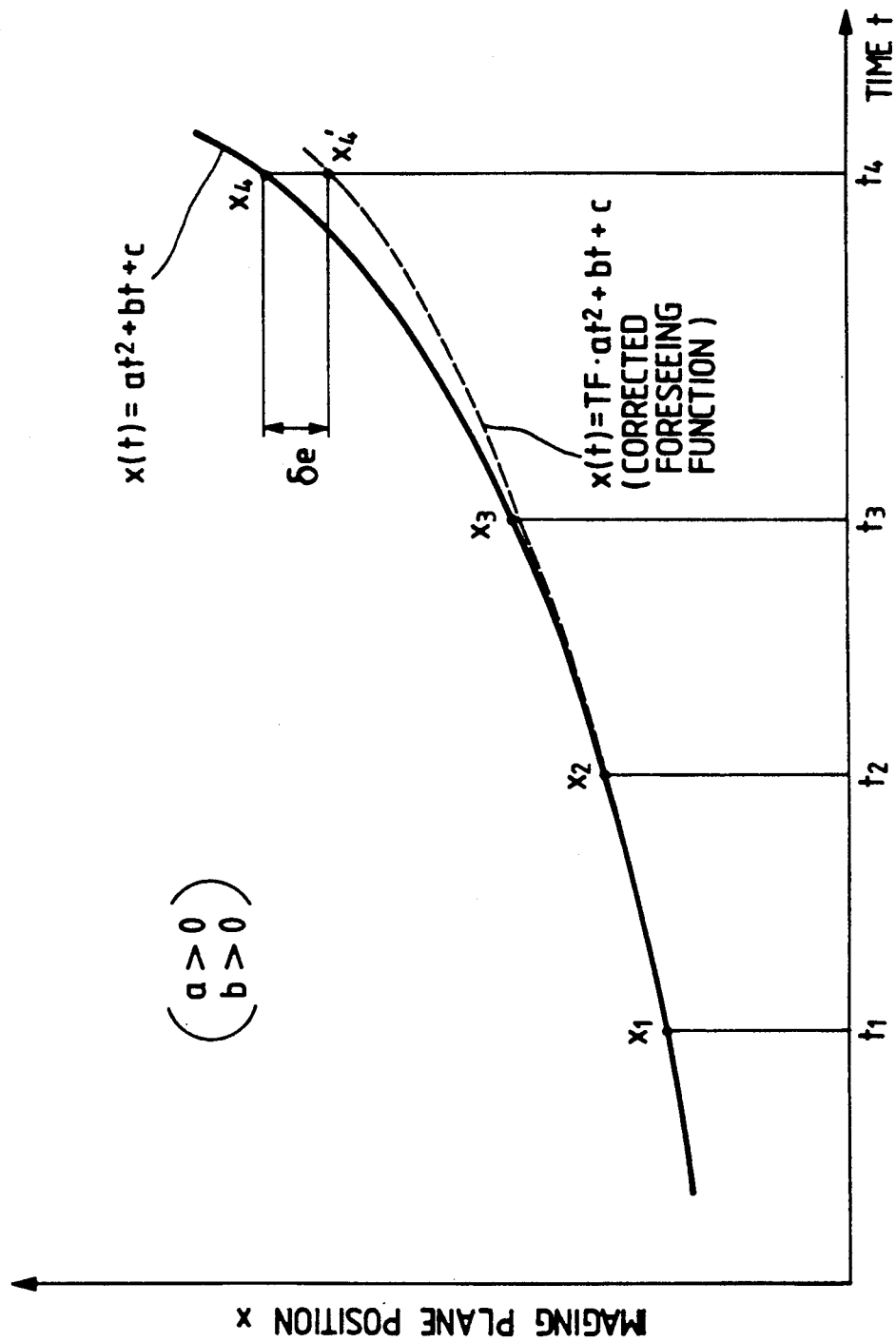
FIGS. 4 and 5 are graphs for illustrating the occurrence of the foreseeing error and the correction of a foreseeing function.
Figure 5:
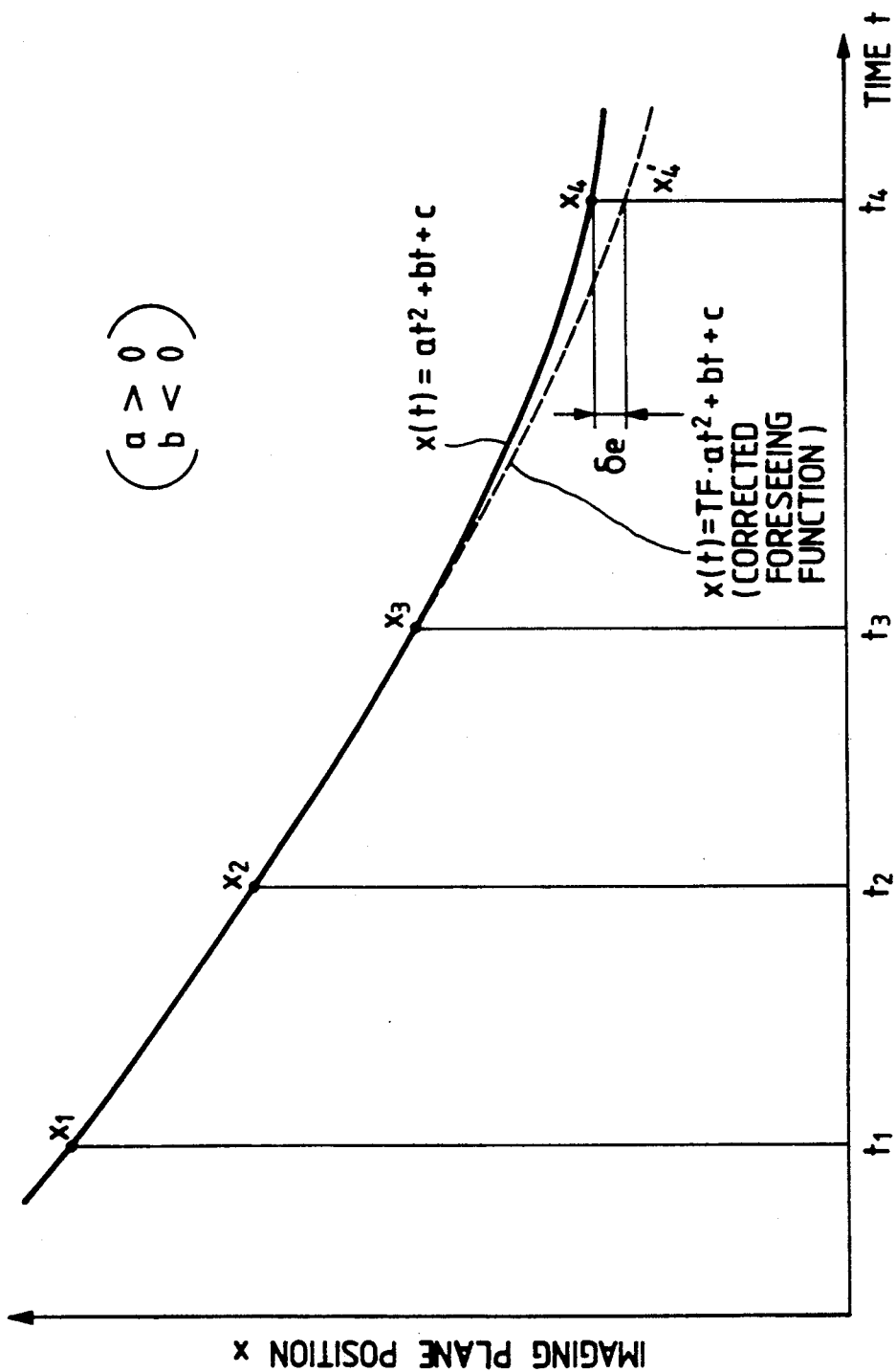

At step (008), the "foreseeing operation" subroutine is executed. The "foreseeing operation" subroutine is for effecting the correction of the amount of lens driving, and the flow thereof is shown in FIG. 1.

Subsequently, at step (009), the "lens driving" subroutine is executed and lens driving is effected on the basis of the amount of lens driving DL corrected at the previous step (008). The flow of this "lens driving"

subroutine is shown in FIG. 9. After the termination of lens driving, a shift is again made to the step (002), and steps (005)–(009) are repetitively executed until the switch SW1 is opened or the switch SW2, not shown, is closed, and proper focus adjustment is effected even for a moving object.

Now, when the release button is further depressed and the switch SW2 is closed thereby, a shift is immediately made from any step to step (010) by the interrupting function and the release operation is started.

At step (011), whether lens driving is being executed is discriminated, and if lens driving is going on, a shift is made to step (012), where a driving stop command is delivered to the lens to stop the lens, and an advance is made to step (013), and if the lens is not being driven, an advance is immediately made to step (013).

At the step (013), mirror-up movement of the quick return mirror of the camera is effected. This is executed by controlling the motor MTR2 by the motor controlling signals M2F and M2R shown in FIG. 6. At the next step (014), the aperture control value already stored by the photometry subroutine of the previous step (005) is sent to the lens to cause the lens to effect aperture control.

Whether the mirror-up movement and the aperture control of the steps (013) and (014) have been completed is detected at step (015), and the mirror-up movement can be confirmed by a detecting switch, not shown, which is annexed to the mirror, and as regards the aperture control, whether the lens has been driven to a predetermined aperture is confirmed by communication. If one of the mirror-up movement and the aperture control is not yet completed, the program waits at this step, and the detection of the state is continuedly effected. When the completion of the two is confirmed, a shift is made to step (016).

At the step (016), control of the shutter is effected at the shutter control value already stored by the photometry subroutine of the previous step (005) and the film is exposed.

When the control of the shutter is terminated, at the next step (017), a command is sent to the lens so as to make the aperture fully open, and subsequently at step (018), mirror-down movement is effected. The mirror-down movement, like the mirror-up movement, is executed by controlling the motor MTR2 by the use of the motor controlling signals M2F and M2R.

At the next step (019), as in the step (015), the program waits for the mirror-down movement and the aperture opening to be completed, and when both of the mirror-down movement and the aperture opening control are completed, shift a is made to step (020).

At the step (020), the motor MTR1 is controlled by properly controlling the motor controlling signals M1F and M1R shown in FIG. 6, whereby the film is wound up by one frame.

What has been described above is the sequence of the camera in which foreseeing AF has been carried out.

A description will now be given of the "image signal input" subroutine shown in FIG. 8.

"Image signal input" is subroutine an operation executed at the beginning of a new focus detecting operation, and when this subroutine is called, at step (102) via step (101), the timer value TIMER of a self-running timer in the microcomputer PRS itself is stored into a memory area TN of the RAM, whereby the starting time of the focus detecting operation is memorized.

At the next step (103), $TM_1$ and $TM_2$ corresponding to the time intervals $TM_1$ and $TM_2$ in the lens driving amount correction equations (6), (7) and (9) are renewed. Before the step (103) is executed, the time intervals in the last focus detecting operation are memorized in $TM_1$ and $TM_2$, and the time when the last focus detecting operation was started is memorized in $TN_1$.

Accordingly, $TM_2$ represents the time interval from the before-last focus detecting operation to the last focus detecting operation and $TN_1$ - TN represents the time interval from the last focus detecting operation to the current focus detecting operation, and these are stored in the memory areas $TM_1$ and $TM_2$ of the RAM which correspond to $TM_1$ and $TM_2$ in the equations (6), (7) and (9). For the next focus detecting operation, the current time TN is stored in $TN_1$. That is, at the step (103), the before-last to the last focus detecting operation time and the last to the current focus detecting operation time are always memorized in the memory areas $TM_1$ and $TM_2$.

Now, at the next step (104), the sensor device SNS is caused to start the accumulation of an optical image. Specifically, the microcomputer PRS renders CSDR into 'H', and sends an "accumulation starting command" as SO to the sensor driving circuit SDR by communication, and in response thereto, the sensor driving circuit SDR renders the clear signal CLR of the photoelectric conversion element portion of the sensor device SNS into 'L' and causes the accumulation of charges to be started.

At step (105), the timer value of the self-running timer is stored in a variable TI and the current time is memorized.

At the next step (106), the state of the input INTEND terminal to the computer PRS is detected, and whether the accumulation has been completed is examined. The sensor driving circuit SDR renders the signal INTEND into 'L' simultaneously with the start of the accumulation, and monitors the AGC signal SAGC (a signal representative of the accumulated amount) from the sensor device SNS, and when this signal SAGC reaches a predetermined level, the sensor driving circuit SDR renders the signal INTEND into 'H' and at the same time, renders a charge transfer signal SH into 'H' for a predetermined time, thereby transferring the charges of the photoelectric conversion element portion to the CCD portion.

If at the step (106), the INTEND terminal is at 'H', it means that the accumulation has been completed and thus, a shift is made to step (110), and if the INTEND terminal is at 'L', it means that the accumulation is not yet completed and thus, shift a is made to step (107).

At the step (107), the time TI memorized at the step (105) is subtracted from the timer value TIMER of the self-running timer and the result is stored in a variable TE. Thus, the time from after the accumulation has been started until now, i.e., the so-called accumulation time, is stored in the variable TE. At the next step (108), TE is compared with a constant MAXINT, and if TE is less than MAXINT, a return is made to the step (106), where the program again waits for the completion of the accumulation. When TE becomes equal to or greater than MAXINT, a shift is made to step (109), where the accumulation is forcibly completed. The forced completion of the accumulation is executed by sending an "accumulation completing command" from the computer PRS to the circuit SDR by said communication signal. When the "accumulation completing command" is sent from the computer PRS, the sensor driving circuit SDR renders the charge transfer signal SH into 'H' for a predetermined time and causes the charges of the photoelectric conversion element portion to be transferred to the CCD portion. Thus, the accumulation by the sensor is completed by the flow up to the step (109).

At step (110), the A/D conversion of a signal AOS obtained by amplifying the image signal OS of the sensor device SNS by the sensor driving circuit SDR and the storage of the digital signal into the RAM is effected. More particularly, the sensor driving circuit SDR produces CCD driving clocks $\phi_1$ and $\phi_2$ in synchronism with the clock CK from the computer PRS and imparts them to a control circuit in the sensor device SNS, and the sensor device SNS has its CCD portion driven by $\phi_1$ and $\phi_2$ and the charges in the CCD are time-serially output as an image signal from the output OS. This signal is amplified by an amplifier in the sensor driving circuit SDR, and thereafter is input as AOS to the analog input terminal of the computer PRS. The computer PRS effects A/D conversion in synchronism with the clock CK, and stores the A/D-converted digital image signals successively at a predetermined address of the RAM.

When the inputting of the image signal is completed in this manner, the "image signal input" subroutine is returned to the main program at step (111).

The flow chart of the "lens driving" subroutine is shown in FIG. 9.

When this subroutine is executed, at step (202), communication is effected with the lens and two data "S" and "PTH" are input. "S" is the "coefficient of the defocus amount vs. the amount of axial movement of the focus adjusting lens" inherent to the photo-taking lens, and for example, in the case of a single lens of the totally axially moved type, the entire photo-taking lens is a focus adjusting lens and therefore, S=1, and in the case of a zoom lens, S varies depending on each zoom position. "PTH" is the amount of axial movement of the focus adjusting lens per one output pulse of the encoder ENCF operatively associated with the movement of the focus adjusting lens LNS in the direction of the optic axis.

Thus, the value of the amount of axial movement of the focus adjusting lens as converted into the output pulse number of the encoder by the defocus amount DL to be focus-adjusted and said S and PTH, i.e., the so-called amount of lens driving FP, is given by the following equation:

$$FP = DL \times S / PHT$$

Step (203) executes the above equation.

At step (204), FP found at the step (203) is sent to the lens to thereby command the driving of the focus adjusting lens (in the case of a totally axially moved type single lens, the entire photo-taking lens).

At the next step (205), communication is effected with the lens and at step (206), whether the driving by the commanded amount of lens driving FP has been terminated is detected, and when the driving is terminated, a shift is made to step (206), where the "lens driving" subroutine is returned to the main program.

As regards the detection of the termination of lens driving, when the amount of driving FP is input to the circuit LPRS as described above and lens driving is begun, the pulse SENCF of the encoder circuit ENCF is counted by a counter in LPRS, and whether this count value coincides with said FP is discriminated in the circuit LPRS, and the output condition of LPRS when the count value coincides with said FP is detected by communication at the step (205) and a shift is made to the step (206).

The flow of the "foreseeing calculation" subroutine will now be described with reference to FIG. 1. FIG. 1 shows the flow of the "foreseeing calculation" subroutine, and in this subroutine, the amount of lens driving taking the release time lag and the AF time lag into account is calculated. At steps (302) and (303), the renewal of the data for the current foreseeing calculation is effected.

That is, at the step (302), the data of memory $DF_2$ is input to $DF_1$. Before the current subroutine is executed, the last defocus amount is input to the memory $DF_2$, but at a point of time whereat the current subroutine is executed, the content of $DF_2$ becomes the before-last defocus amount and therefore, this is input to the memory $DF_1$ so that the before-last defocus amount is always stored in the memory $DF_1$.

Also, the content of memory $DF_3$ is input so that the last defocus amount is always stored in $DF_2$, and the current detected defocus amount DEF is stored in $DF_3$ so that the current defocus amount is always stored in $DF_3$.

Also, at the step (303), the data of memory $DL_2$ is input to memory $DL_1$, whereby the before-last amount of lens driving is always stored in $DL_1$. Also, data DL is input to the memory $DL_2$. The data DL is the data of the last amount of driving, and the data of the amount of lens driving effected immediately before is always stored in the memory $DL_2$.

At the steps (302) and (303), a plurality of past defocus amounts to the current defocus amount and the data of the amount of lens driving are renewed and stored in the respective memories.

At steps (304) and (305), A and B representing the terms a and b of the equations (6) and (7) are found on the basis of the data stored in memories $DF_1$-$DF_3$, $DL_1$, $DL_2$, $TM_1$ and $TM_2$.

At the next step (306), whether the object is coming close or going away or is at a standstill is discriminated by a subroutine which will be described later.

At step (307), the anticipated time lag TL is calculated by the subroutine which will be described later, and a shift is made to step (308).

At the step (308), a correction coefficient is found by the subroutine which will be described later, and a shift is made to step (309).

At the step (309), the calculation of the following equation conforming to the aforementioned equation (10) is effected on the basis of the data in each memory and the result of the calculations of the steps (304), (305), (307) and (308):

$$DL = TF \cdot A[(TM_1 + TM_2 + TL)^2 - (TM_1 + TM_2)^2] + B \cdot TL + DF_3, \quad (15)$$

whereby the amount of lens driving DL as converted into the current amount of movement of the imaging plane is found. Thereafter, at step (310), a return is made to the main program.

When the foreseeing calculation is effected in this manner, at step (009), the above-described lens driving is done, whereby the lens is shifted to a position which coincides with the imaging plane position.

The flow of the "discrimination of moving direction of object" subroutine will now be described.

Figure 10:
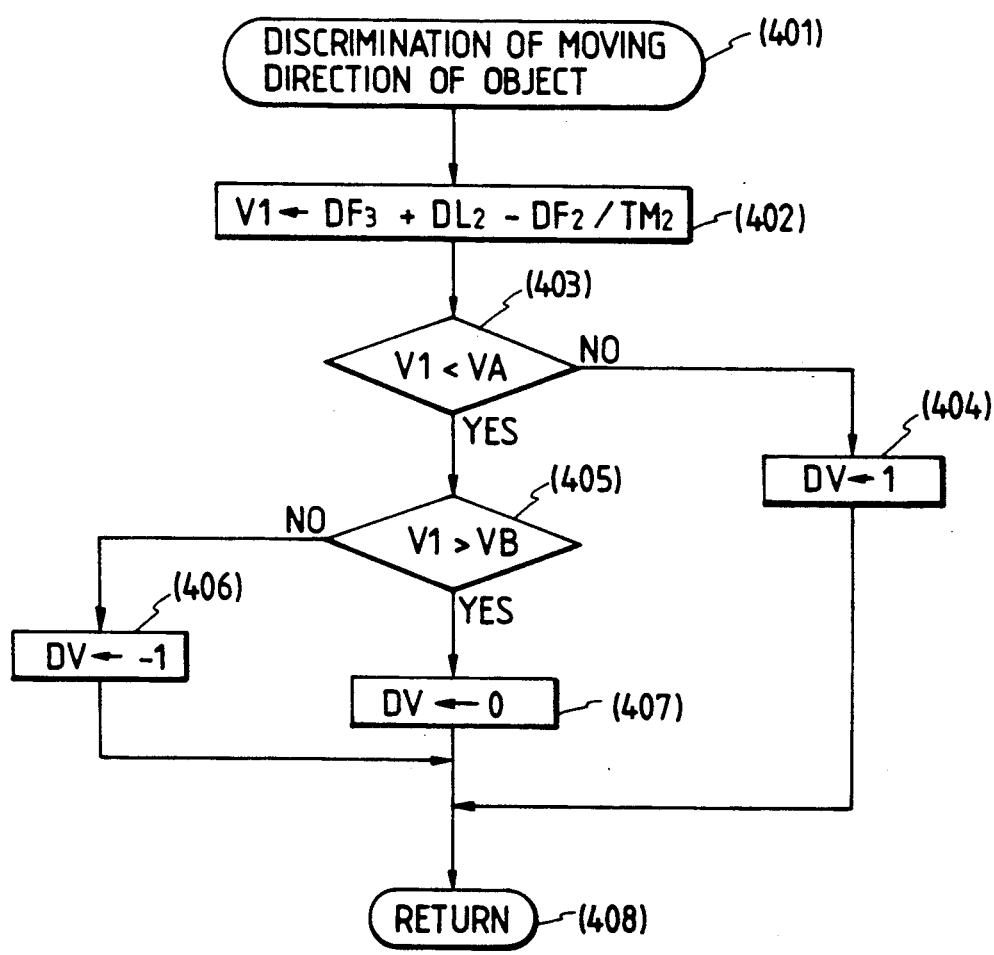
FIG. 10 shows the "discrimination of moving direction of object" subroutine in FIG. 1.

FIG. 10 shows the flow of the "discrimination of moving direction of object subroutine", and at step (402), the average imaging plane movement velocity V1 at the distance measurement time interval TM$_2$ is calculated. This average imaging plane movement velocity is calculated as follows:

$$V1 = (x_3 - x_2)/TM_2 \qquad (16)$$
$$= (DF_3 + DL_2 - DF_2)/TM_2$$

At the next step (403), whether the imaging plane movement velocity V1 is smaller than a predetermined value VA is discriminated, and if V1 is smaller than VA, shift a is made to step (405), and if V1 is greater than VA, a shift is made to step (404). Here, the predetermined value VA is a positive value and in the present embodiment, VA=0.5 mm/sec., and if V1 is greater than VA, it is judged that the object is coming close, and a advance is made to the step (404), where DV is rendered into "1", and at the next step (408), a return is made to the main program. Also, if at the step (403), V1 is smaller than VA, a advance is made to the step (405), where V1 is compared with a predetermined value VB, and if V1 is greater than VB, a shift is made to step (407), and if not so, a shift is made to step (406). The value of VB is a negative value, and here, it is to be understood that VB=-0.5 mm/sec.

At the step (406), DV is rendered into "1", and at the next step (408), a return is made to the main program. Also, at the step (407), DV is rendered into "0", and at the next step (408), a return is made to the main program.

Thus, in the present embodiment, if the imaging plane movement velocity is greater than VA (0.5 mm/sec), it is judged that the object is coming close, and DV is rendered into DV=1, and if the imaging plane movement velocity is greater than VB (-0.5 mm/sec.) and smaller than VA (0.5 mm/sec.), it is judged that the object is hardly moving, and DV is rendered into DV=0. Also, if the imaging plane movement velocity is smaller than VB (-0.5 mm/sec.), it is judged that the object is going away, and DV is rendered into DV=-1.

Thus, in this subroutine, when the object is coming close, DV=1, and when the object is going away, DV=-1, and when the object is at a standstill or is moving little, DV=0.

The flow of the "calculation of anticipated time lag TL" subroutine will now be described.

Figure 11:
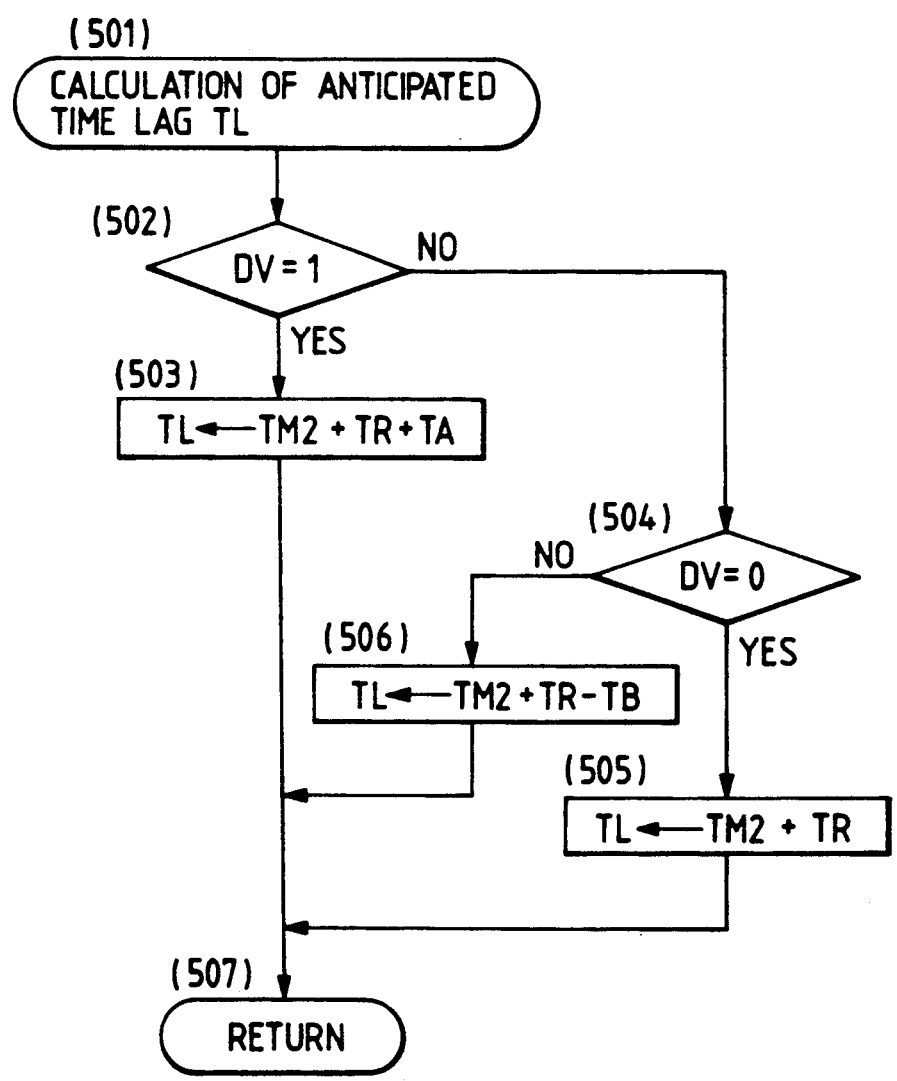
FIG. 11 shows the "calculation of anticipated time lag" subroutine in FIG. 1.

FIG. 11 shows the flow of the "calculation of anticipated time lag TL subroutine", and at step (502), whether DV set in the previous flow is "1" is discriminated, and if DV=1, an advance is made to step (503), and if DV≠1, shift a is made to step (504) At the step (503), the anticipated time lag TL when the object is coming close is calculated, and in the present embodiment, it is calculated as follows:

$$TL = TM_2 + TR + TA, \qquad (17)$$

where it is to be understood that TA=20 msec.

Although the anticipated time lag is longer by TA=20 msec. relative to the conventional TL, this need not always be 20 msec., but may be other values, and when the tendency toward the rearward focus becomes strong due to other parameters, for example, the imaging plane movement velocity, the distance between the camera and the object, the ID and focal length of the photo-taking lens, and the coefficients a and b calculated by the equations (6) and (7), TA may be changed so as to become greater.

Subsequently at the step (504), whether DV=0 is discriminated, and if DV=0, an advance is made to step (505), and if DV≠0, an advance is made to step (506). At the step (505), the object is moving little and therefore, TL need not be particularly corrected and is calculated as follows, in the same manner as in the prior art.

$$TL = TM_2 + TR \qquad (18)$$

When the step (505) is terminated, an advance is made to step (507), and a return is made to the main program.

Also, at the step (506), the anticipated time lag TL when the object is going away is calculated as follows:

$$TL = TM_2 + TR - TB \qquad (19)$$

where TB=20 ms.

This TL is shorter by TB (=20 ms) than the conventional TL, whereas this need not be 20 ms, but may be other values, and TB may be changed so as to be greater when the tendency toward the rearward focus becomes strong due to other parameters, for example, the imaging plane movement velocity, the distance between the camera and the object, the ID and focal length of the photo-taking lens, the coefficients a and b in the equations (6) and (7), etc.

When the step (506) is terminated, an advance is made to step (507), and a return is made to the main program to terminate this flow.

That is, when the object is coming close, TL is made longer by 20 ms than the conventional TL, and when the object is going away, TL is made shorter by 20 ms than the conventional TL.

The flow of the "calculation of correction coefficient subroutine" subroutine will now be described.

Figure 12:
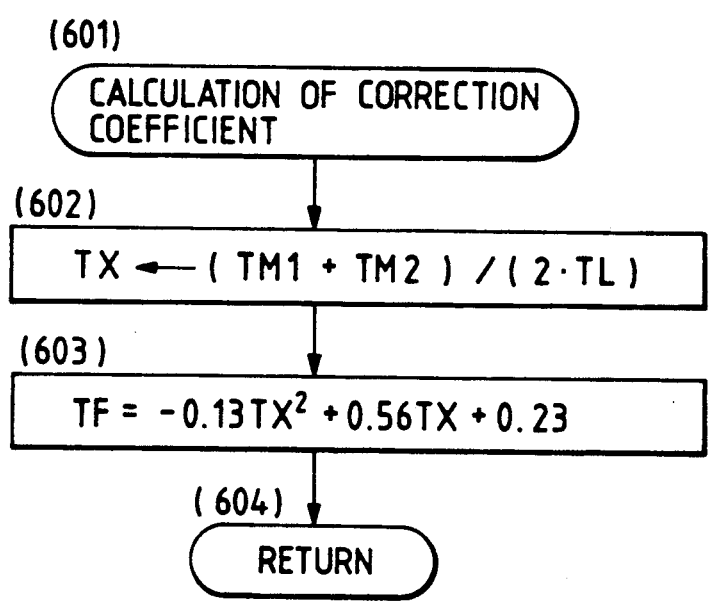
FIG. 12 shows the "calculation of correction coefficient" subroutine in FIG. 1.

FIG. 12 shows the flow of the "calculation of correction coefficient", and at step (602), the ratio $TX=(TM_1+TM_2)/(2 \cdot TL)$ of the focus detecting operation time interval to the time lag used for foreseeing is calculated on the basis of the data in the memory areas TM$_1$ and an TM$_2$ and TL found at the step (307), and advance is made to the next step.

At step (603), a coefficient TF for correcting the second-order term by TX obtained at the step (602) is calculated, and a return is made to the main program.

In the present embodiment, perceiving that if the release time lag is constant, the focus detecting operation time interval becomes shorter when the value of TX is small, the correction coefficient TF is set so as to become smaller as TX becomes smaller (0<TF≦1). Also, when TX is great, if TF is made excessively small, there will be an adverse effect and therefore, TF is set so as to approach 1 when TX is great.

As described above, in the present invention, correction is made so as to reduce the coefficient of the second-order term in the amount of lens driving found by the equation (9) at the step (309) and therefore, the error of the amount of lens driving based on the equation (9) can be decreased.

Figure 13:
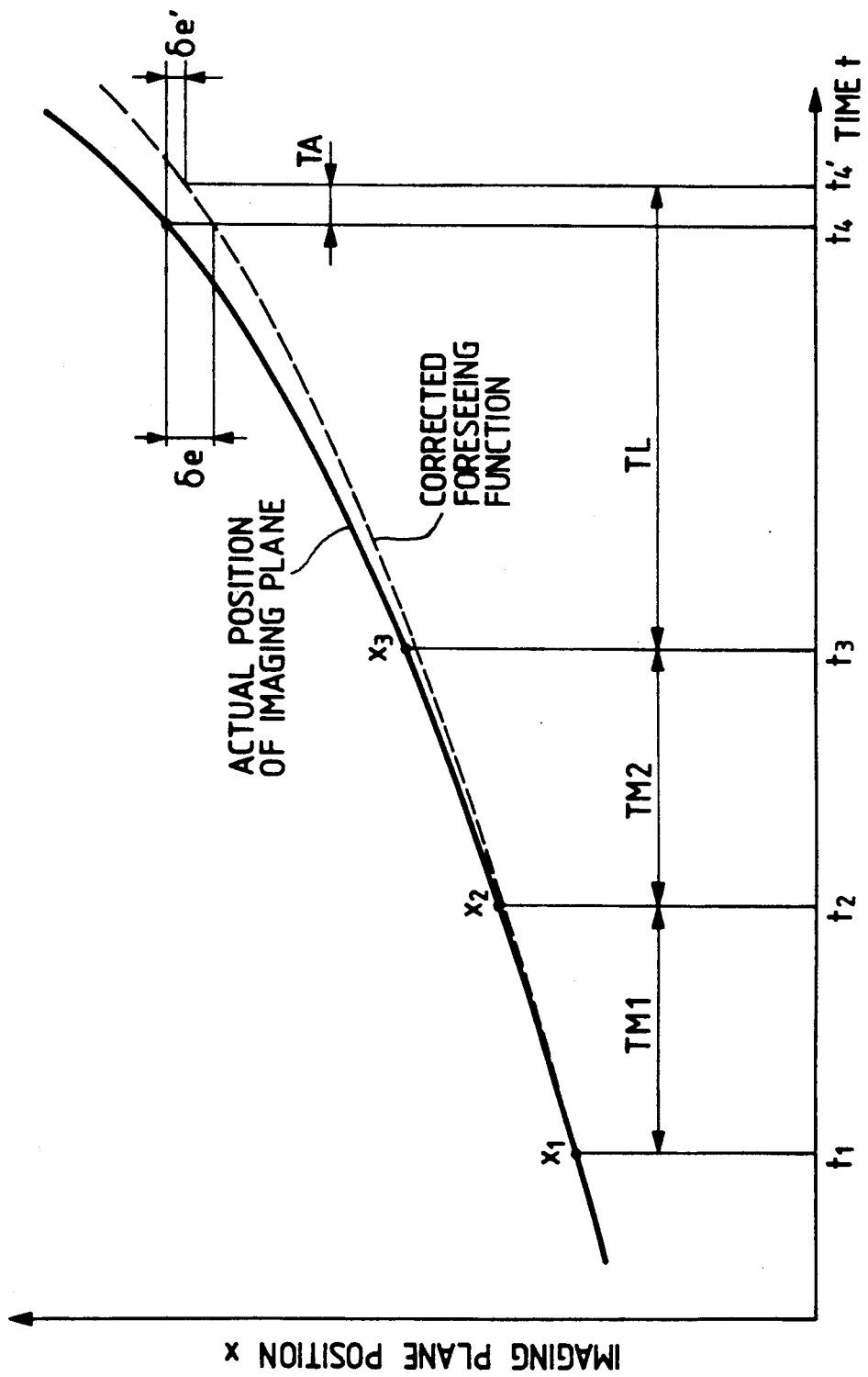
FIGS. 13 and 14 are graphs showing the effect of the present invention.
Figure 14:
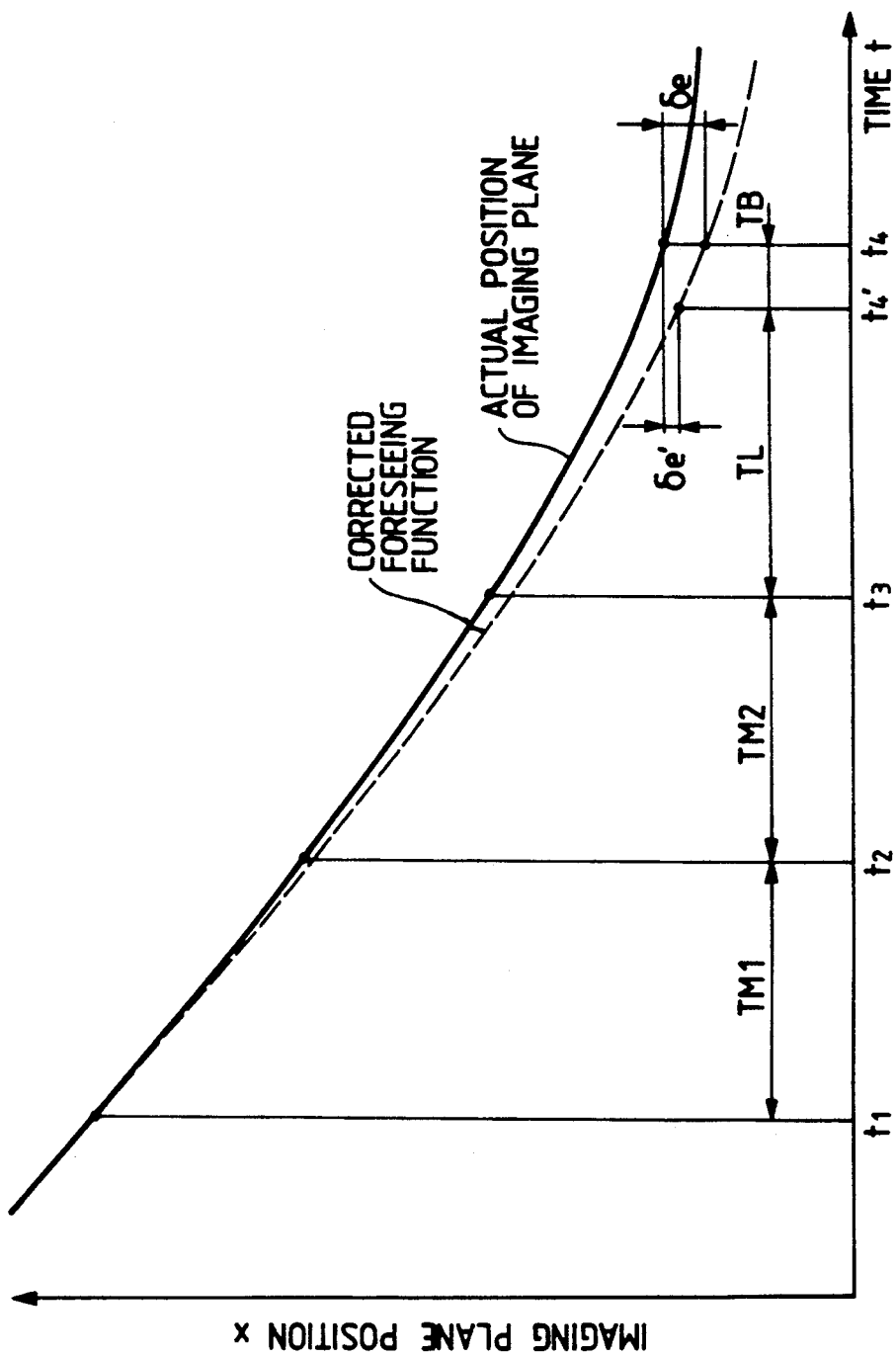

FIGS. 13 and 14 shows the effect when the present invention has been actually carried out.

In FIG. 13, the ordinate represents the imaging plane position and the abscissa represents time, and this figure shows variations when the object comes close to the camera. Here, $t_1$ and $t_2$ are the past distance measurement times, $t_3$ is the time when the current distance measurement is effected, and $t_4$ is the time which is the target of foreseeing. The solid line indicates the actual imaging plane position, and the broken line indicates the foreseeing function by which correction has been effected.

In this figure TL has heretofore been set relative to the foreseeing target $t_4$ as follows:

$$TL = t_4 - t_3 \quad (20)$$

Thereupon, the then foreseeing error becomes rearward focus by $\delta e$. In contrast, the setting of TL by the present invention is made with $t_4'$ as the target, and is as follows:

$$TL = t_4' - t_3 = t_4 - t_3 + TA \quad (21)$$

By making TL longer by TA, the foreseeing error $\delta e'$ is made greatly smaller than the conventional $\delta e$. That is, it becomes possible to drive the lens to a position nearer to the actual imaging plane position, and accomplish highly accurate lens control.

Again in FIG. 14, the ordinate represents the imaging plane position and the abscissa represents time, and this figure shows variations when the object goes away from the camera.

Here, $t_1$ and $t_2$ are the times when distance measurement was effected in the past, $t_3$ is the time when the current distance measurement is effected, and $t_4$ is the time which is the target of foreseeing. The solid line indicates the actual imaging plane position, and the broken line indicates the foreseeing function by which correction has been effected.

In this figure, TL has heretofore been set relative to the foreseeing target as follows:

$$TL = t_4 - t_3$$

Thereupon, the then foreseeing value becomes rearward focus by $\delta e$. In contrast, TL of the present invention is set with not $t_4$, but $t_4'$ short of $t_4$ by TB as the target and therefore is as follows:

$$TL = t_4' - t_3 = t_4 - t_3 - TB$$

Thereupon, the foreseeing error at this time decreases to $\delta e'$, and lens control of higher accuracy than the conventional one can be accomplished.

The above-described operation of the present invention may be summed up as follows.

When at the step (306) in the foreseeing calculation subroutine in FIG. 1, the direction of movement of the object is detected and it is judged that the object is coming close, at the step (307), TL is set to a value longer than usual. Thereby, the amount of lens driving found at the step (309) can be made greater than during the ordinary foreseeing, that is, can be increased by a predetermined amount, and thus, the above-mentioned rearward focus amount is decreased. On the other hand, when it is judged that the object is going away, TL is set to a value shorter than usual, and the amount of lens driving can be made smaller than during the ordinary foreseeing, that is, can be decreased by a predetermined amount, and again in this case, the rearward focus amount can be decreased.

Also, in the present embodiment, when the imaging plane movement velocity is small, it is not particularly necessary to operate the anticipated time lag TL and therefore, TL is set in the same manner as the conventional TL, whereby the value of TL can be prevented from changing over suddenly and greatly when the object is coming close or going away or when the object is not moving very greatly. Also, if in this area, the correction amount of TL is set so as to change continuously from $-TB$ to TA or in multiple stages, it will become possible to change over TL smoothly.

Further, in an area wherein the imaging plane movement velocity is small, it is not necessary to effect follow-up correction and therefore, in this area, there will be no problem even if follow-up correction is inhibited and lens control is effected so that the defocus amount is "0" relative to the result of focus detection obtained last.

Also, in the present embodiment, the movement of the object is detected and the change-over of the anticipated time lag is effected, but it is necessary not only to change over the anticipated time lag depending on the movement of the object, but also to change the anticipated time lag as a matter of course because there is a difference between sequences when, for example, the photographing mode of the camera is a single shot or a sequence shot. Also, even in the same sequence shot, the foreseeing AF using a plurality of past distance measurement data permits other sequences to enter between the distance measurements for the first, second or subsequent frame and therefore, it is necessary to change the anticipated time lag. When it is thus necessary to change the anticipated time lag depending on the photographing conditions or the photographing mode of the camera, it becomes possible to change the anticipated time lag to an appropriate time lag to thereby accomplish highly accurate focus adjustment over a wide range.

Further, the change of the anticipated time lag depending on the movement of the object and the photographing conditions is not restricted to being singly effected, but the anticipated time lag may be considered with the two taken into account.

Figure 15:
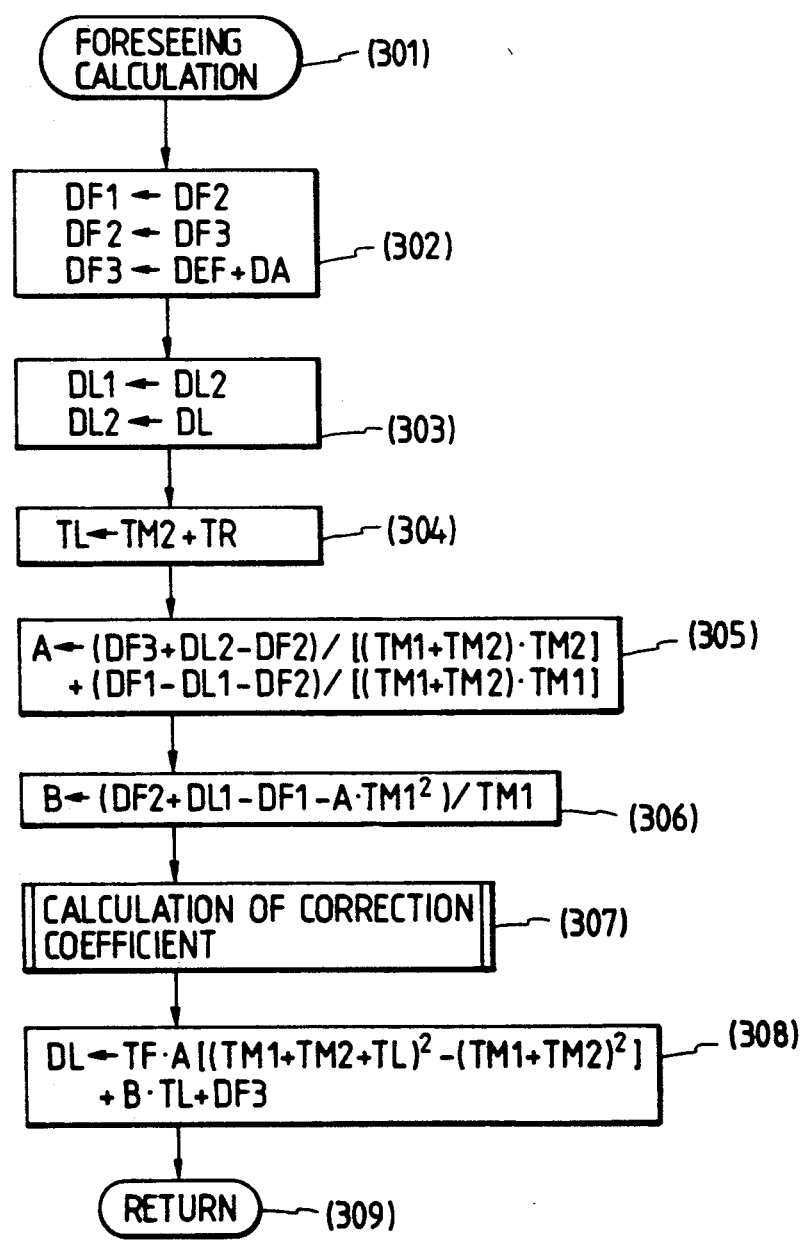
FIG. 15 illustrates a program showing another embodiment of the foreseeing operation used in the focus adjusting device of the present invention.

FIG. 15 shows the flow of another embodiment of the "foreseeing operation" subroutine shown at the step (008) of FIG. 7, and this will hereinafter be described.

At steps (302) and (303), the data renewal for the current foreseeing operation is effected. That is, at the step (302), the data in memory $DF_2$ is input to $DF_1$. Before the current subroutine is executed, the last defocus amount DEF plus a predetermined value DA is input to the memory $DF_2$, but at a point of time whereat the current subroutine is executed, the content of $DF_2$ becomes equal to the before-last defocus amount plus DA and therefore, this is input to memory $DF_1$ so that the before-last defocus amount plus DA is always stored in the memory $DF_1$.

Also, the content of memory $DF_3$ is input to $DF_2$ so that the last defocus amount plus DA is always stored in $DF_2$, the current detected defocus amount DEF plus the predetermined amount DA is stored in $DF_3$ and the current defocus amount plus DA is always stored in $DF_3$.

Here, $DF_1$, $DF_2$ and $DF_3$ store therein the detected defocus amount plus the predetermined amount DA, whereby the camera is always judged to be in more rearward focus by DA than the actual defocus amount, with a result that the lens is axially moved toward the foreward focus by DA.

In the present embodiment, this shift amount DA is constant, whereas this need not be a single value, but it is possible to make the value of DA great when the tendency toward rearward focus becomes strong and the imaging plane movement velocity is great or when the distance between the object and the camera is small, and to make the value of DA small when not so. It is also possible to determine the value of DA by the use of the coefficients a and b calculated from other parameter equations (6) and (7), and shift the lens properly toward the forward focus by an amount always conforming to that state.

At the step (303), the data in memory $DL_2$ is input to memory $DL_1$ and the data of the before-last amount of lens driving is always stored in $DL_1$. Also, data DL is input to the memory $DL_2$. The data DL is the data of the last amount of driving, and the data of the amount of lens driving effected immediately before is always stored in the memory $DL_2$.

At the above-described steps (302) and (303), the data of a plurality of past defocus amounts and amounts of lens driving and the current defocus amount and amount of lens driving are renewed and stored in the respective memories.

At step (304), the calculation of the time lag TL is effected. This calculation is executed by finding the sum of the data in the memory area $TM_2$ and the release time lag TR. As previously described, the last to the current focus detecting operation time are stored in the memory area $TM_2$, and the time lag $TL = TM_2 + TR$ is found on the assumption that the current focus detecting operation time is also coincident with the last focus detecting operation time.

At steps (305) and (306), A and B representing the terms a and b of the equations (6) and (7) are found on the basis of the data stored in memories $DF_1$-$DF_3$, $DL_1$, $DL_2$, $TM_1$ and $TM_2$.

At the next step (307), a correction coefficient TF is found in a subroutine to be described, and a shift is made to step (308).

At this step (308), on the basis of the data in each memory and the calculated values of the steps (304)-(306), the following calculation conforming to the aforementioned equation (10) is effected:

$$DL = TF \cdot A[(TM_1 + TM_2 + TL)^2 - (TM_1 + TM_2)^2] + B \cdot TL + DF_3, \quad (15)$$

whereby the current amount of lens driving DL as converted into the image plane movement amount is found. Thereafter, at step (309), a return is made to the main program.

When the foreseeing operation is effected in this manner, at the step (009) of FIG. 9, the above-described lens driving is effected, whereby the lens is shifted to a position which coincides with the imaging plane position.

Here, the calculated DL is a value for driving the lens always to a position shifted by DA toward the forward focus, and if the foreseeing error heretofore deviated toward the rearward focus and the value of DA are substantially equal to each other, the lens is driven to a proper position which is always in focus.

The flow of the "calculation of correction coefficient" subroutine will now be described.

Figure 16:
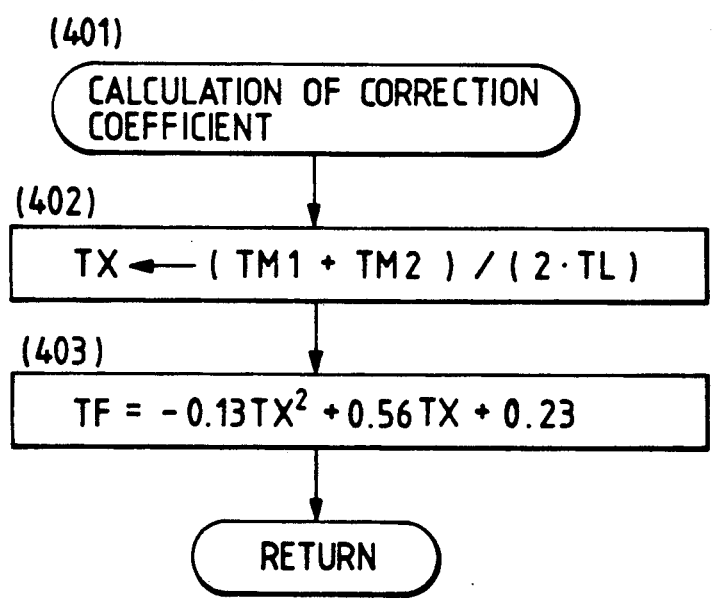
FIG. 16 shows the "calculation of correction coefficient" subroutine in FIG. 15.

FIG. 16 shows the flow of the "calculation of correction coefficient subroutine", and at step (402), the ratio $TX = (TM_1 + TM_2)/(2 - TL)$ of the focus detecting operation time interval to the time lag used for foreseeing is calculated on the basis of the data in the memory areas $TM_1$ and $TM_2$ and TL found at the above-mentioned step (304), and an advance is made to the next step.

At step (403), a coefficient TF for correcting the second-order term is calculated by TX obtained at the step (402), and a return is made to the main program.

In the present embodiment, perceiving that if the release time lag is constant, the focus detecting operation time interval becomes short when the value of TX is small, the correction coefficient TF is set so as to become smaller as TX becomes smaller ($0 < TF \leq 1$). Also, when TX is great, if TF is made excessively small, it will adversely affect TX and therefore, TF is set so as to become approximate to 1 when TX is great.

As described above, in the present invention, correction is made so as to reduce the coefficient of the second-order term in the amount of lens driving found at the step (308) by the equation (9) and therefore, the error of the amount of lens driving based on the equation (9) can be decreased.

Figure 17:
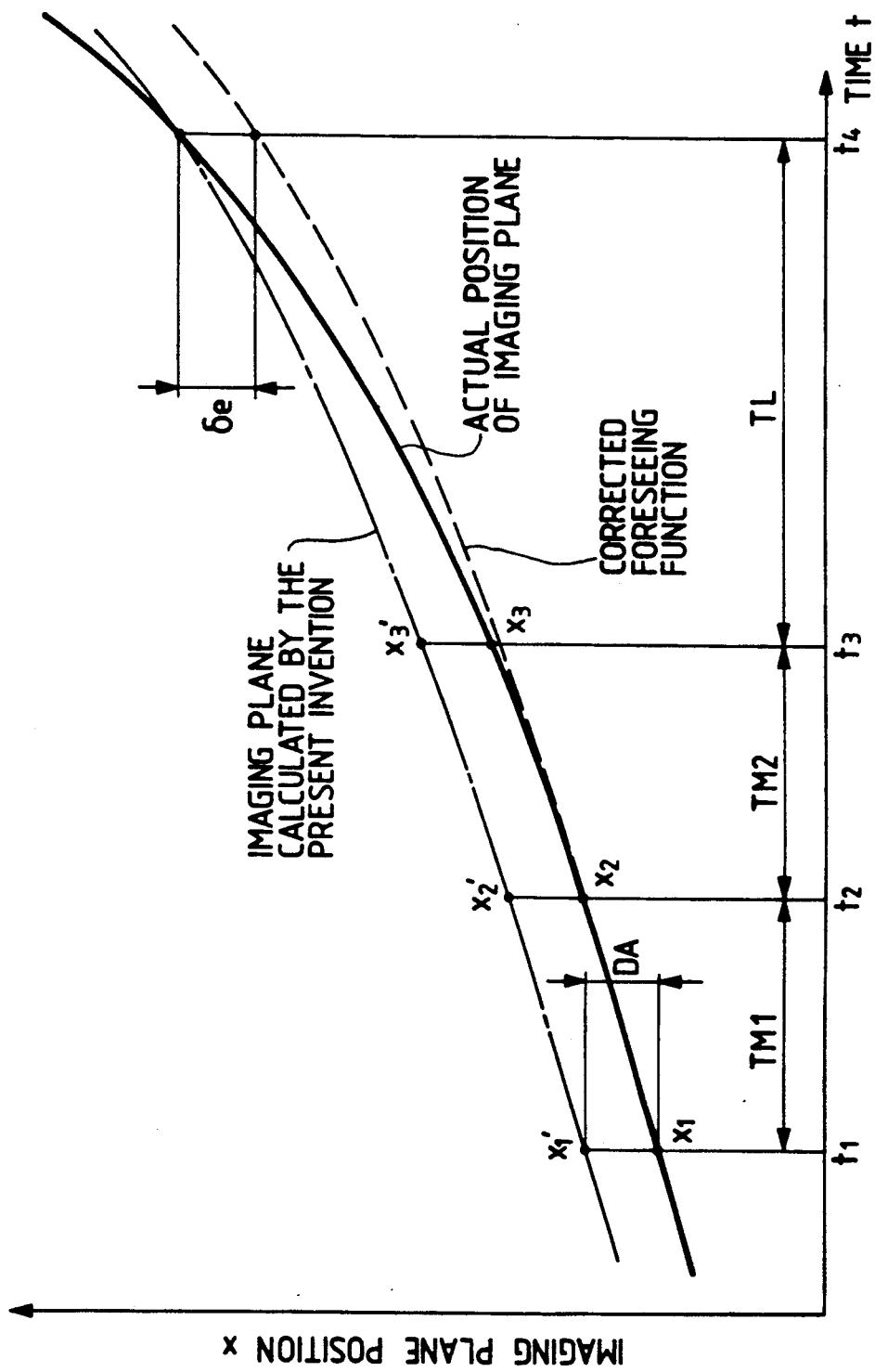
FIGS. 17 and 18 are graphs for illustrating the effect of the present invention.
Figure 18:
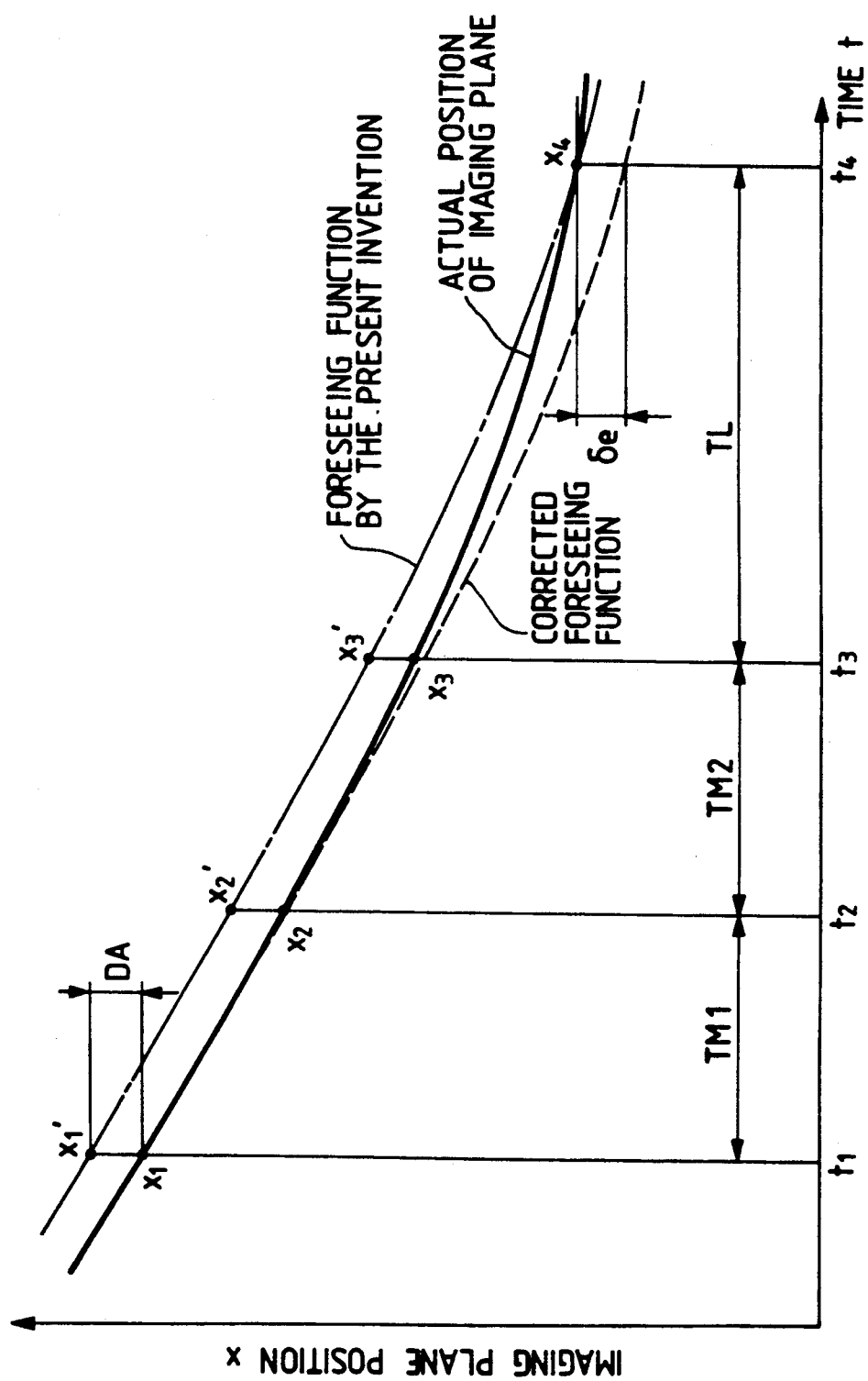

FIGS. 17 and 18 shows the effect when the present invention is carried out.

In FIG. 17, the ordinate represents the imaging plane position and the abscissa represents time, and this figure shows variations when the object comes close to the camera. Here, $t_1$ and $t_2$ are the distance measurement times in the past, $t_3$ is the time when the current distance measurement is effected, and $t_4$ is the time which is the target of foreseeing. The solid line indicates the actual imaging plane position, the broken line indicates the corrected conventional foreseeing function, and the dot-and-dash line indicates the foreseeing function by the present invention.

In this figure, $x_1$, $x_2$ and $x_3$ are the imaging plane positions used to find the conventional foreseeing function. In contrast, in the present invention, the foreseeing function is calculated by the use of $x_1'$, $x_2'$ and $x_3'$, i.e., the points shifted by DA from $x_1$, $x_2$ and $x_3$, respectively. Therefore, a follow-up delay of $\delta e$ has heretofore occurred at a time $t_4$, but according to the present invention, follow-up is improved by the shift amount DA and thus, it becomes possible to obtain a higher follow-up performance. That is, if DA equivalent to the foreseeing error $\delta e$ is chosen proper focus adjustment will always become possible.

Next, in FIG. 18, the ordinate represents the imaging plane position and the abscissa represents time, and this figure shows variations when the object goes away from the camera. Here, $t_1$ and $t_2$ are the times when distance measurement was effected in the past, $t_3$ is the time when the current distance measurement is effected, and $t_4$ is the time which is the target of foreseeing. The solid line indicates the actual imaging plane position, the broken line indicates the corrected conventional foreseeing function, and the dot-and-dash line indicates the foreseeing function by the present invention.

In this figure, $x_1$, $x_2$ and $x_3$ are the imaging plane positions used to find the conventional foreseeing function. In contrast, in the present invention, the foreseeing function is calculated by the use of $x_1'$, $x_2'$ and $x_3'$ shifted by DA from $x_1$, $x_2$ and $x_3$, respectively. Therefore, in the past, at a time $t_4$, the lens has preceded too much by $\delta e$ to thereby provide the rearward focus. In contrast, in the present invention, follow-up is improved by the shift amount DA and thus, it becomes possible to obtain a higher follow-up performance. That is, if DA is chosen so as to become an amount equivalent to the foreseeing error δe, proper focus adjustment will always become possible.

As described above, in the present embodiment, the foreseeing operation shown at the step (308) of FIG. 15 is effected with the detected defocus amount DEF plus the predetermined amount DA as focus data and therefore, the lens can always be drive-controlled to a position shifted by DA toward the forward focus, and the above-described rearward focus state can be corrected.

Figure 19:
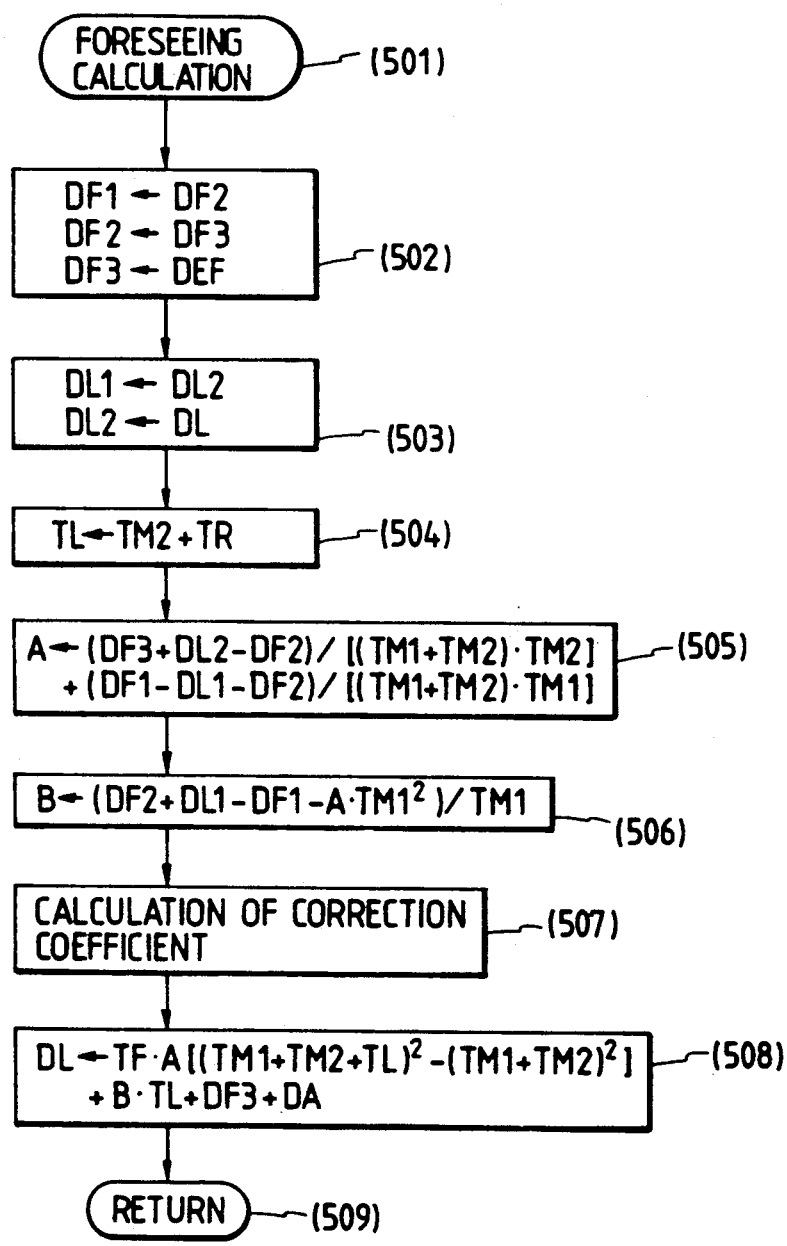
FIG. 19 illustrates another "foreseeing operation" subroutine of the present invention.

FIG. 19 is a program showing another example of the foreseeing operation subroutine of the present invention. This subroutine will now be described. At steps (502) and (503), the renewal of the data for the current foreseeing operation is effected.

That is, at the step (502), the data in memory $DF_2$ is input to $DF_1$. Before the current subroutine is executed, the last defocus amount is input to the memory $DF_2$, but at a point of time whereat the current subroutine is executed, the content of $DF_2$ becomes the before-last defocus amount and therefore, this is input to memory $DF_1$ so that the before-last defocus amount is always stored in the memory $DF_1$.

Also, the content of memory $DF_3$ is input to $DF_2$ so that the last defocus amount is always stored in $DF_2$, and the current detected defocus amount DEF is stored in $DF_3$ so that the current defocus amount is always stored in $DF_3$.

At step (503), the data in memory $DL_2$ is input to memory $DL_1$ so that the data of the before-last amount of lens driving is always stored in $DL_1$. Also, data DL is input to the memory $DL_2$. The data DL is the data of the last amount of driving, and the data of the amount of lens driving effected immediately before is always stored in the memory $DL_2$.

At the above-described steps (502) and (503), the data of a plurality of past defocus amounts and the current defocus amount and amount of lens driving are renewed and stored in the respective memories.

At step (504), the calculation of the time lag TL is effected. This calculation is executed by finding the sum of the data in the memory area $TM_2$ and the release time lag TR. As previously described, the last to the current focus detecting operation time are memorized in the memory area $TM_2$, and the time lag $TL = TM_2 + TR$ is found on the assumption that the current focus detecting operation time is also coincident with the last focus detecting operation time.

At steps (505) and (506), A and B representing the terms a and b in the equations (6) and (7) are found on the basis of the data stored in memories $DF_1$-$DF_3$, $DL_1$, $DL_2$, $TM_1$ and $TM_2$.

At the next step (507), a correction coefficient TF is found by the subroutine shown in FIG. 16, and shift is made to step (508).

At this step (508), the current amount of lens driving DL as converted into the amount of movement of the imaging plane is found from the following equation on the basis of the data in each memory and the values calculated at the steps (504)–(507):

$$DL = TF \cdot A[(TM_1 + TM_2 + TL)^2 - (TM_1 + TM_2)^2] + B \cdot TL + DF_3 + DA \qquad (16)$$

Here, by adding DA to the conventional DL during the calculation of DL, the lens is axially moved by DA toward the forward focus side. Thereafter, at step (509), a return is made to the main program.

When the foreseeing operation is performed in this manner, the above-described lens driving is performed at the step (009) of FIG. 7, whereby the lens is shifted to a position which coincides with the imaging plane position.

In the present embodiment, addition has been performed so that the lens is shifted by the predetermined amount DA toward the forward focus side, whereas the value of this DA is not limited to a particular value, but when the tendency toward the rearward focus becomes strong in the conventional foreseeing method as when, for example, the distance between the camera and the object is small or when the imaging plane movement velocity is great, it is possible to make DA great, and when not so, it is possible to make the value of DA small, and it is also possible to change DA by a and b in equations (6) and (7).

Further, the depth of field becomes greater on the inner side than on this side and therefore, if the depth of field is set so as to always provide a little forward focus, the depth of field can be utilized more effectively. This is not restricted to servo AF, but is also effective for one-shot auto focusing.

By driving the lens by DA toward the forward focus side in this manner, the lens position which has heretofore has the tendency toward the rearward focus can be driven to an appropriate lens position, and if DA of substantially the same magnitude as the foreseeing error which provides the rearward focus in the conventional method is chosen, there can always be provided highly accurate foreseeing AF.

We claim:

1. An autofocus device, comprising:
   (a) a focus detection circuit for repeatedly performing a focus detection operation to an object;
   (b) a calculation circuit for calculating an image plane position which is a predetermined distance closer on a near force side than a foreseen image plane for the object after expiration of a predetermined time based on a past focus detection operation, and for determining a lens driving amount corresponding to the calculated image plane position; and
   (c) a lens driving circuit for driving a lens by the lens driving amount obtained by said calculation circuit.

2. An autofocus device according to claim 1, wherein said focus detection circuit detects a defocus amount, and wherein data which is calculated by adding a predetermined amount to the detected defocus amount is input to said calculation circuit as a result of the focus detection.

3. An autofocus detection circuit according to claim 1, wherein said calculation circuit adds a predetermined amount to a lens driving amount which corresponds to the foreseen image plane position for the object after expiration of the predetermined time on the basis of the past focus detection operation obtained by said focus detection circuit, and outputs an added result as the lens driving amount corresponding to the calculated image plane position.

4. An autofocus device, comprising:
   (a) a focus detection circuit for repeatedly performing a focus-detection operation to an object;
   (b) a discrimination circuit for discriminating a direction of movement of the object;
   (c) a calculation circuit for receiving (a) results of a past focus detection operation detected by said focus detection circuit and (b) a predetermined time as factors for calculating a control amount related to an imaging plane position of the object after expiration of the predetermined time;

(d) an adjusting circuit for adjusting said predetermined time input to said calculation circuit based on the direction of movement of the object discriminated by said discrimination circuit; and (e) a lens driving circuit for driving a lens based on the control amount obtained by said calculation circuit.

5. A camera having an autofocus device, comprising:

(a) a focus detection circuit for repeatedly performing a focus detection operation to an object;

(b) a calculation circuit for calculating an image plane position which is a predetermined distance closer on a near focus side than a foreseen image plane for the object after expiration of a predetermined time based on a past focus detection operation, and for determining a lens driving amount corresponding to said calculated image plane position; and (c) a lens driving circuit for driving a lens by the lens driving amount obtained by said calculation circuit.

6. A camera according to claim 5, wherein said focus detection circuit detects a defocus amount, and wherein data which is calculated by adding a predetermined amount to the detected defocus amount is input to said calculation circuit as a result of the focus detection.

7. A camera according to claim 5, wherein said calculation circuit adds a predetermined amount to a lens driving amount which corresponds to the foreseen image plane position for the object after expiration of the predetermined time based on the past focus detection operation obtained by said focus detection circuit, and outputs an added result as the lens driving amount corresponding to the calculated image plane position.

8. A camera having an autofocus device, comprising:

(a) a focus detection circuit for repeatedly performing a focus detection operation to an object;

(b) a discrimination circuit for discriminating a direction of movement of the object;

(c) a calculation circuit for receiving (a) results of a past focus detection operation detected by said focus detection circuit and (b) a predetermined time as factors for calculating a control amount related to an imaging plane position of the object after expiration of the predetermined time;

(d) an adjusting circuit for adjusting said predetermined time input to said calculation circuit based on the direction of movement of the object discriminated by said discrimination circuit; and (e) a lens driving circuit for driving a lens based on the control amount obtained by said calculation circuit.

9. An autofocus device according to claim 1, wherein said calculation circuit determines the foreseen image plane by using a higher order function, coefficients of which are determined by using focus data and time data obtained in the past focus detection operation.

10. An autofocus device according to claim 1, wherein said calculation circuit determines the lens driving amount by using a higher order function, coefficients of which are determined by using focus data and time data obtained in the past focus detection operation.

11. An autofocus device according to claim 2, wherein said calculation circuit determines the foreseen image plane by using a higher order function, coefficients of which are determined by using focus data and time data obtained in the past focus detection operation.

12. An autofocus device according to claim 3, wherein said calculation circuit determines the foreseen image plane by using a higher order function, coefficients of which are determined by using focus data and time data obtained in the past focus detection operation.

13. A camera according to claim 5, wherein said calculation circuit determines the foreseen image plane by using a higher order function, coefficients of which are determined by using focus data and time data obtained in the past focus detection operation.

14. A camera according to claim 7, wherein said calculation circuit determines the foreseen image plane by using a higher order function, coefficients of which are determined by using focus data and time data obtained in the past focus detection operation.

15. A camera according to claim 8, wherein said calculation circuit determines the control amount by using a higher order function, coefficients of which are determined by using focus data and time data obtained in the past focus detection operation.

* * * * *

UNITED STATES PATENT AND TRADEMARK OFFICE
CERTIFICATE OF CORRECTION

PATENT NO. : 5,089,843
DATED : February 18, 1992
INVENTOR(S) : Masaki HIGASHIHARA, et al.

It is certified that error appears in the above-identified patent and that said Letters Patent is hereby corrected as shown below:

COLUMN 1:
    Line 48, "and" should read --over--; and
    Line 51, "expected to be" should be deleted.

COLUMN 2:
    Line 5, "the" should be deleted; and
    Line 24, "provided" should read --achieved--.

COLUMN 8:
    Line 59, "applicant" should read --assignee--.

COLUMN 9:
    Line 53, "shift a" should read --a shift--; and
    Line 62, "is subroutine" should read --subroutine is--.

COLUMN 13:
    Line 21, "a" should read --an--;
    Line 24, "a" should read --an--; and
    Line 56, "shift a" should read --a shift--.

Signed and Sealed this

Sixth Day of July, 1993

Attest:

MICHAEL K. KIRK

Attesting Officer    Acting Commissioner of Patents and Trademarks